(12) United States Patent
Okishiro et al.

(10) Patent No.: US 7,916,115 B2
(45) Date of Patent: Mar. 29, 2011

(54) LIQUID CRYSTAL DISPLAY

(75) Inventors: Kenji Okishiro, Kodaira (JP); Yoshinori Aono, Kokubunji (JP); Masaaki Komatsu, Kodaira (JP); Masatoshi Shiiki, Musashimurayama (JP)

(73) Assignee: Hitachi Displays, Ltd., Chiba (JP)

( * ) Notice: Subject to any disclaimer, the term of this patent is extended or adjusted under 35 U.S.C. 154(b) by 1244 days.

(21) Appl. No.: 10/539,066

(22) PCT Filed: Dec. 16, 2002

(86) PCT No.: PCT/JP02/13122
§ 371 (c)(1),
(2), (4) Date: Jun. 15, 2005

(87) PCT Pub. No.: WO2004/055577
PCT Pub. Date: Jul. 1, 2004

(65) Prior Publication Data
US 2006/0208998 A1    Sep. 21, 2006

(51) Int. Cl.
*G09G 3/36* (2006.01)
(52) U.S. Cl. ......................................... 345/102
(58) Field of Classification Search .................. 345/102, 345/87; 362/561, 556, 613–614, 34, 84
See application file for complete search history.

(56) References Cited

U.S. PATENT DOCUMENTS

| | | | | |
|---|---|---|---|---|
| 3,623,994 A | * | 11/1971 | Royce et al. | 252/301.4 R |
| 4,616,161 A | * | 10/1986 | Yukawa et al. | 315/382 |
| 5,260,625 A | * | 11/1993 | Holden et al. | 313/486 |
| 5,825,124 A | * | 10/1998 | Ohno et al. | 313/467 |
| 6,075,325 A | * | 6/2000 | Kouno et al. | 315/307 |
| 6,388,649 B1 | * | 5/2002 | Tanaka et al. | 345/89 |
| 7,106,294 B2 | * | 9/2006 | Kumamoto et al. | 345/102 |
| 2002/0036608 A1 | * | 3/2002 | Hirakata et al. | 345/87 |
| 2002/0057238 A1 | * | 5/2002 | Nitta et al. | 345/87 |
| 2002/0067332 A1 | * | 6/2002 | Hirakata et al. | 345/102 |
| 2003/0142118 A1 | * | 7/2003 | Funamoto et al. | 345/691 |
| 2003/0174370 A1 | * | 9/2003 | Shimomura et al. | 358/509 |

FOREIGN PATENT DOCUMENTS

JP  10-333591  12/1998
JP  2002-72208  3/2002

OTHER PUBLICATIONS

"Image Quality in Displaying Moving Images in Hold-Type Display" (IEICE Technical Report, EID 99-10, pp. 55-60).
"Image Quality Revolution" (Flat-Panel Display 2002, pp. 96-101).

* cited by examiner

*Primary Examiner* — Chanh Nguyen
*Assistant Examiner* — Robert M Stone
(74) *Attorney, Agent, or Firm* — Antonelli, Terry, Stout & Kraus, LLP.

(57) ABSTRACT

A liquid crystal display including a blink backlight system light source and a liquid crystal panel for adjusting the amount of light transmitted from the light source. The light source is made of a plurality of light emitting tubes each having one or more kinds of phosphors, and having a turned-on state and a turned-off state within one frame. A luminance factor area of light from each of the phosphors is substantially equal to that of light from any other phosphor in at least one of a luminance rise time when the light source changes from the turned-off state to the turned-on state and a luminance fall time when the light source changes from the turned-on state to the turned-off state.

33 Claims, 21 Drawing Sheets

FIG.3
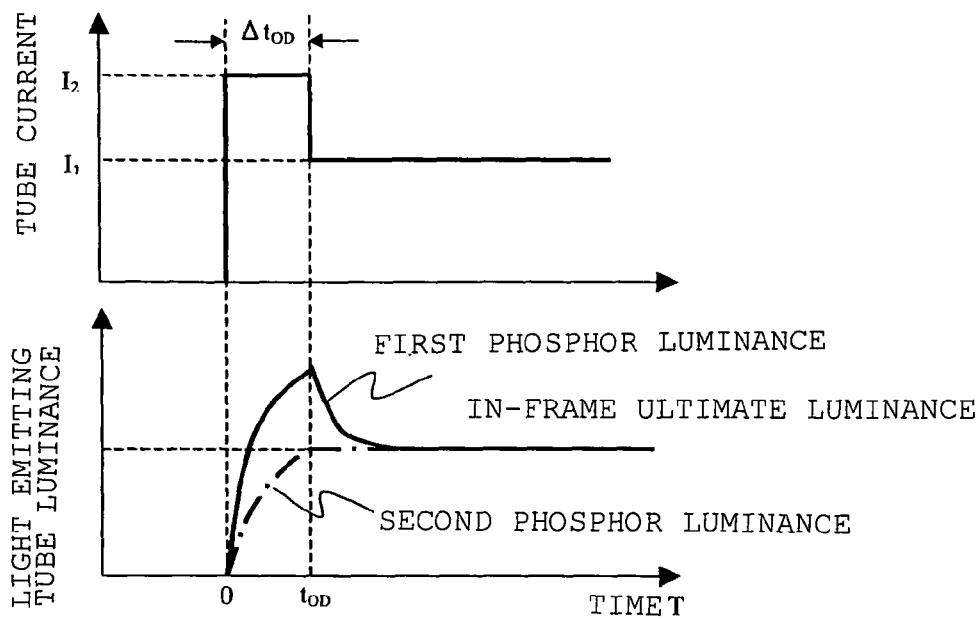
(a)
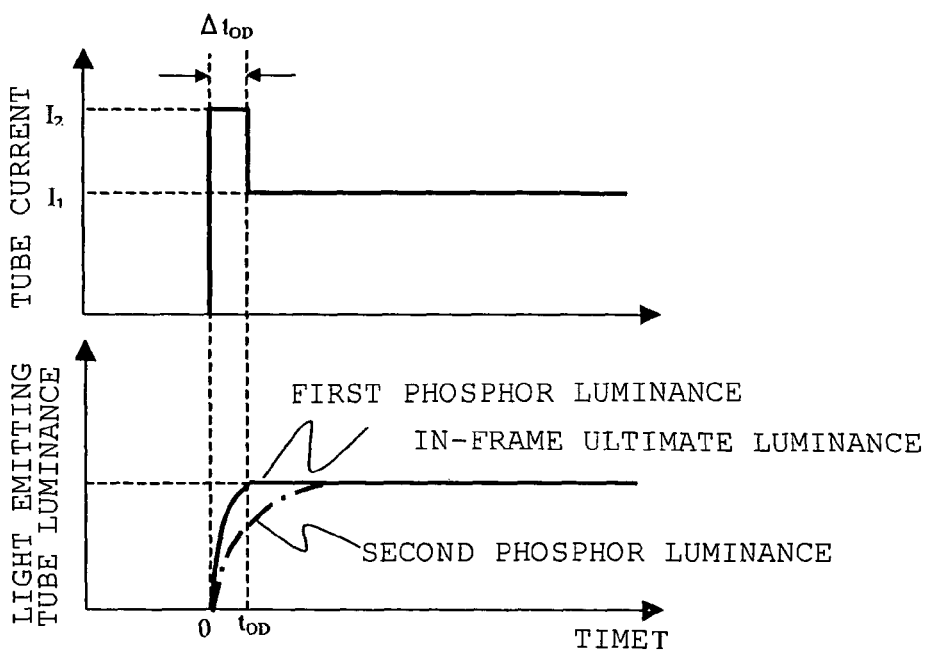
(b)

FIG.15
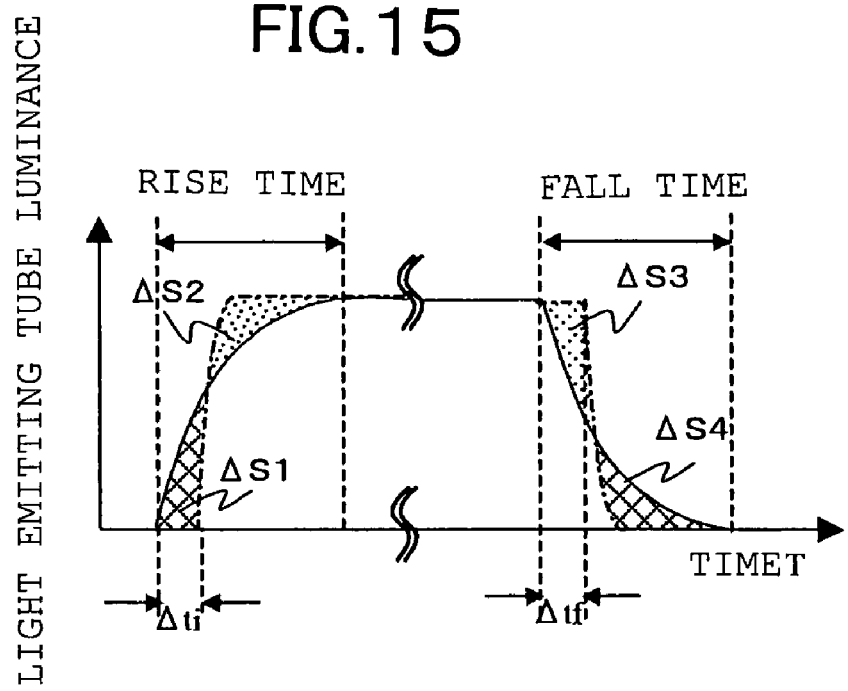
(a)
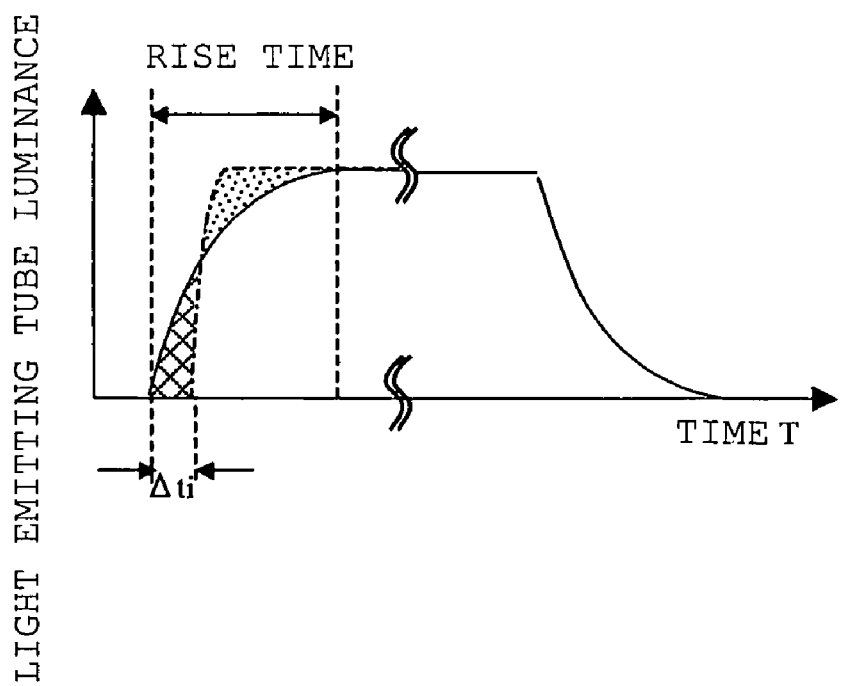
(b)

FIG.22    (Prior Art)
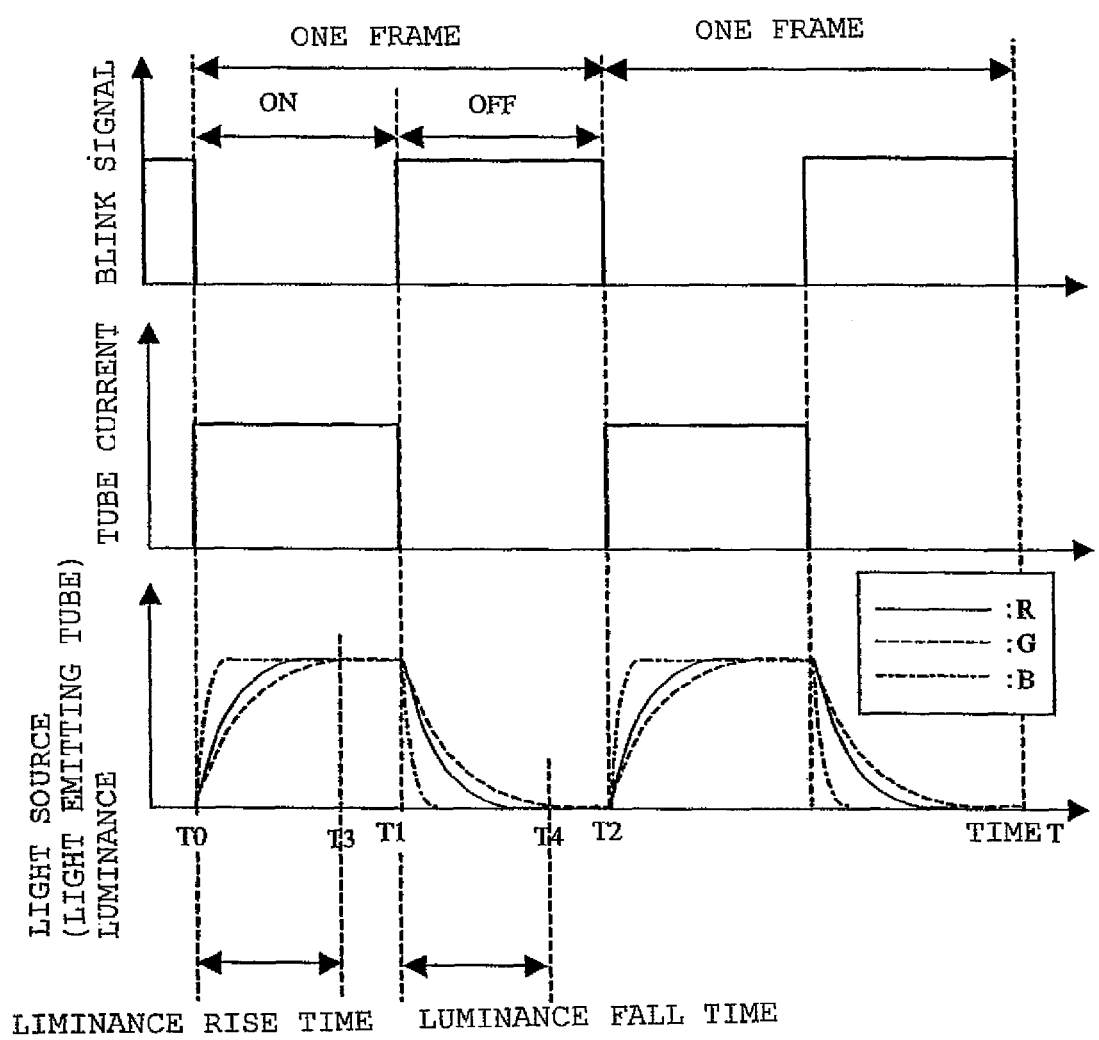

LIQUID CRYSTAL DISPLAY

FIELD OF THE INVENTION

The present invention relates to a liquid crystal display, and particularly relates to a liquid crystal display in which color misregistration is improved to suppress moving image blurring.

DESCRIPTION OF BACKGROUND ART

Liquid crystal displays have expanded their market as small-size displays for watches, cellular phones, etc. and as notebook-type personal computer monitors and desktop-type personal computer monitors taking the place of CRTs (Cathode Ray Tubes) due to their features of light weight, low profile and low power consumption. Further, recently, applications of liquid crystal displays have been expanded as monitors or TV sets supporting DVD playback for displaying not only still images but also moving images. Thus, the applications range widely.

However, when moving images are displayed in a liquid crystal display serving as a personal computer monitor in the background art, there appears an image quality deterioration such as a phenomenon (hereinafter referred to as "moving image blurring") that the display contents are blurred. Thus, the performance of the liquid crystal display is inferior to that of a CRT.

This moving image blurring has been described in detail, for example, in "Image Quality in Displaying Moving Images in Hold-type Display" (IEICE Technical Report, EID 99-10, p. 55), which suggests that the moving image blurring is largely caused by a difference in display system between a CRT and a liquid crystal display.

That is, the moving image blurring is caused by a hold-type display system in which constant luminance is always kept within one frame in the liquid crystal display, as compared with an impulse display system in which lighting is performed at only a certain moment in one frame in the CRT. It is suggested that the moving image blurring appears in the hold-type display system due to a difference between an integral path assumed by the display system and an integral path based on a human sight line.

Accordingly, when a display system close to an impulse-type display system as in the CRT is used in the liquid crystal display, it is possible to improve the moving image blurring caused largely by the hold-type display system. As a specific means for such a solution, there has been proposed a blink backlight system in which a backlight serving as a light source of a liquid crystal display is lit like pulses in one display period so as to realize a pseudo impulse display system.

Some liquid crystal displays using this blink backlight system have been already manufactured by way of trial, and it has been confirmed that the moving image blurring can be improved. For example, the details have been described in "Image Quality Revolution" 'Flat-Panel Display 2002, p. 96) and so on.

Here, FIG. 19 shows a schematic diagram of a background-art liquid crystal display using a blink backlight system. In FIG. 19, the liquid crystal display is constituted by a power supply 1; a video signal processing circuit 2; a control circuit 3; a drain driver 4; a gate driver 5; a common driver 6; a liquid crystal panel 7; a light source drive circuit 11 having an inverter 8, a blink signal generation circuit 9 and a switching device 10; and a light source 13 formed out of light emitting tubes 12.

Each light emitting tube 12 forming the light source 13 of the liquid crystal display is typically made of a three band fluorescent tube 12. The fluorescent tube is connected to the inverter circuit 8. The on/off timing of a voltage or a current supplied from the inverter circuit to the fluorescent tube is controlled by a signal (hereinafter referred to as "blink signal") from the blink signal generation circuit 9.

For example, as shown in FIG. 20, a current value I is applied into the fluorescent tube in accordance with a signal from the inverter circuit 8 at the timing $T=T_0$ when the blink signal is turned on. Thus, the fluorescent tube is also turned on at the same time. At the timing $T=T_1$ when the blink signal is turned off, the current becomes zero. Thus, the fluorescent tube is also turned off at the same time.

In such a manner, the backlight is blinked within one frame so that a turned-on state and a turned-off state are set. Thus, a pseudo impulse display system close to the CRT display system is attained so that blurring of moving images can be improved. Accordingly, the blink backlight system is a very important technique in a moving image supporting liquid crystal display such as a liquid crystal television set.

However, when the backlight is blinked like pulses within one frame, there occurs a new problem. That is a problem of "color misregistration" appearing in a moving image contour portion.

For example, assume that a black window 15 is displayed on a white background 14 and this black window 15 is moved from the left side of the screen to the right side, as shown in FIG. 21. In this event, of the black window contour portion, a contour portion 16 perpendicular to the black window moving direction 17 has color fringing (color misregistration).

This "color misregistration" phenomenon will be described below.

A three band fluorescent tube is generally used as a light source of a liquid crystal display as described previously. The three band fluorescent tube is filled with discharge gas such as mercury gas, and three color (R, G and B) fluorescent materials are applied to the inner wall of the tube. As soon as a current is applied to the fluorescent tube, discharge breaks out inside the tube, and ultraviolet rays 254 nm long are chiefly emitted due to the mercury gas. The ultraviolet rays excite the fluorescent materials applied to the inner wall of the fluorescent tube so that three color (R, G and B) lights are emitted from the fluorescent materials to the outside of the tube.

Accordingly, the fluorescent materials are ideally blinked in accordance with the on/off switching of the current. In fact, however, due to the response speed of each fluorescent material itself, it takes time for the fluorescent material to reach its intended luminance after the fluorescent material is irradiated with the ultraviolet rays, as shown in FIG. 22. Further, the response time differs from one fluorescent material (R, G, B) to another. Thus, color is shifted in the rise time of luminance. In addition, as for the fall time of luminance, the time for the luminance to fall (turn off) differs from one fluorescent material to another in the same manner. Thus, color is shifted likewise.

Incidentally, the rise time of luminance here means a time ($T_0<T<T_3$) required for enough rise of the luminance of a fluorescent material having the slowest response speed after the current is turned on. On the other hand, the fall time of luminance means a time ($T_1<T<T_4$) required for enough fall of the luminance of the fluorescent material having the slowest response speed after the current is turned off.

At present, $Y_2O_3$:Eu, $LaPO_4$:Tb,Ce and (Ba,Sr)$MgAl_{10}O_{17}$:Eu are used as fluorescent materials of the three colors, that is, red, green and blue respectively in a typical three band fluorescent tube. Of these fluorescent materials, the blue fluorescent material typically has the fastest response speed. The luminance rise response time and the luminance fall response time of (Ba,Sr)MgAl$_{10}$O$_{17}$:Eu are shorter than 1 msec. The luminance rise response time and the luminance fall response time of the red Y$_2$O$_3$:Eu range from 3 msec to 4 msec, and those of the green LaPO$_4$:Tb,Ce are longer, ranging from 6 msec to 7 msec. Incidentally, the luminance rise response time here means a time required for the luminance to reach 90% from 0% on the assumption that the ultimate luminance is 100%. On the other hand, the luminance fall response time here means a time required for the luminance to reach 10% from 100%

For example, when the fluorescent tube has a characteristic shown in FIG. 22, the fluorescent tube emits white light with a bluish tone in the luminance rise time, and white light with a greenish tone in the luminance fall time.

When the backlight is blinked like pulses within one frame in order to improve blurring of moving images, the blurring of moving images can be improved, but there occurs a new problem of color misregistration due to blinking of the backlight.

SUMMARY OF THE INVENTION

It is an object of the present invention to provide a moving image supporting liquid crystal display superior in display performance and successful in improving "color misregistration" in the luminance rise time and the luminance fall time that may occur when the backlight is turned on/off to blink within one frame in order to improve blurring of moving images. To achieve the object, the present invention uses the means as follows.

The present invention provides a liquid crystal display including: a light source made of a plurality of light emitting tubes each having one or more kinds of phosphors, and having a turned-on state and a turned-off state within one frame; and a liquid crystal panel for adjusting the amount of light transmitted from the light source; wherein a luminance factor area of light from each of the phosphors is substantially equal to that of light from any other phosphor in at least one of a luminance rise time when the light source changes from the turned-off state to the turned-on state and a luminance fall time when the light source changes from the turned-on state to the turned-off state.

The present invention also provides a liquid crystal display including: a light source made of a plurality of light emitting tubes each having one or more kinds of phosphors, and having a turned-on state and a turned-off state within one frame; and a liquid crystal panel for adjusting the amount of light transmitted from the light source; wherein a change in luminance factor per time of light from each of the phosphors is substantially equal to that of light from any other phosphor in at least one of a luminance rise time when the light source changes from the turned-off state to the turned-on state and a luminance fall time when the light source changes from the turned-on state to the turned-off state.

As a first configuration of the light source, the light source is made of light emitting tubes of one kind, and each of the light emitting tubes is a multicolor light emitting tube having three or more kinds of phosphors. Then, luminance of the phosphors is controlled by a current value of a current applied to each of the light emitting tubes.

As for a current drive method, at the beginning of the luminance rise time, the current value of the current applied to the light emitting tube is set as a current value $I_2$ not smaller than a current value $I_1$ necessary for the phosphors to emit light with predetermined luminance in one frame.

It is desired that a time $\Delta t_{OD}$ when the current value $I_2$ not smaller than the current value $I_1$ necessary for the phosphors to emit light with the predetermined luminance is applied to the light emitting tube, a ratio N of the current value $I_2$ to the current value $I_1$, and a rise response time $\tau_{on}$ of a fastest luminance response phosphor of the phosphors belonging to the light emitting tube, satisfy a relationship of Expression 1:

$$\Delta t_{OD} \leq \{-\tau_{on}/\ln 10\} \times \ln(1-1/N) \quad \text{(Expression 1)}$$

where $N = I_2/I_1$.

Further, it is desired that the ratio N of the current value $I_2$ to the current value $I_1$ is larger than 1 and smaller than 6.5.

As for another current control method, there is a method in which a current value of a current applied to each of the light emitting tubes is increased stepwise in the luminance rise time. In this event, it is desired that a step time width $\Delta t_{step}$ of the current whose current value is increased stepwise is set to be shorter than a luminance rise response time of a slow luminance response phosphor of the phosphors and to be longer than a luminance rise response time of a fast luminance response phosphor of the phosphors.

As for further another current control method, there is a method in which a current value of a current applied to each of the light emitting tubes is attenuated stepwise in the luminance fall time. In this event, it is desired that a step time width $\Delta t_{step}$ of the current whose current value is attenuated stepwise is set to be shorter than a luminance rise response time of a slow luminance response phosphor of the phosphors and to be longer than a luminance rise response time of a fast luminance response phosphor of the phosphors.

Next, as a second configuration of the light source, the light source is made of light emitting tubes of at least two kinds, and each of the light emitting tubes is a multicolor light emitting tube having at least two kinds of phosphors.

As a third configuration of the light source, the light source is made of light emitting tubes of at least two kinds, and at least one of the light emitting tubes is a unicolor light emitting tube having only one kind of phosphor.

As a fourth configuration of the light source, the light source is made of light emitting tubes of at least three kinds, and each of the light emitting tubes is a unicolor light emitting tube having only one kind of phosphor.

In the second and third configurations of the light source, at least two kinds of phosphors belonging to one and the same tube of the multicolor light emitting tubes are designed to have a substantially equal luminance rise response time and a substantially equal luminance fall response time. Also in these second to fourth configurations of the light source, luminance of the phosphors is controlled by a current value of a current applied to each of the light emitting tubes.

As a current drive means, a current value of a current applied to each light emitting tube having a fast luminance response phosphor is increased gradually in the luminance rise time.

In addition, at the beginning of the luminance rise time, the current value of the current applied to each light emitting tube having a slow luminance response phosphor is set as a current value $I_2$ not smaller than a current value $I_1$ necessary for the phosphors to emit light with predetermined luminance in one frame. Further, the current value of the current applied to each light emitting tube having a fast luminance response phosphor is attenuated gradually in the luminance fall time.

In the luminance rise time and a lighting period, a current value of a current applied to each light emitting tube is changed like a rectangular shape so as to drive the light emitting tube.

In the current having a current value changed like a rectangular shape, a time width of the rectangular current value immediately after beginning of application of the current is made longer than a time width of the rectangular current value immediately before termination of application of the current. In addition, this configuration is characterized in that the time width of the rectangular current value is not longer than 3.3 msec.

In the luminance rise time, time of beginning of application of a current to each light emitting tube having a fast luminance response phosphor is controlled to be delayed by a predetermined time $\Delta t_i$ with respect to time of beginning of application of a current to each light emitting tube having a slow luminance response phosphor, so that a luminance factor area of the fast luminance response phosphor is substantially equal to a luminance factor area of the slow luminance response phosphor.

Also in the luminance fall time, time of termination of application of a current to each light emitting tube having a slow luminance response phosphor is controlled to be delayed by a predetermined time $\Delta t_f$ with respect to time of termination of application of a current to each light emitting tube having a fast luminance response phosphor, so that a luminance factor area of the fast luminance response phosphor is substantially equal to a luminance factor area of the slow luminance response phosphor.

Here it is desired that the luminance rise time and the luminance fall time are made not longer than 3.3 msec.

It is also desired that a luminance rise response time and a luminance fall response time of a slow luminance response phosphor of the phosphors are made not longer than 3.3 msec.

The delay times $\Delta t_i$ and $\Delta t_f$ are made almost half as long as a luminance rise response time and a luminance fall response time of a slow response phosphor of the phosphors respectively. Further, the delay times $\Delta t_i$ and $\Delta t_f$ are made not longer than 1.7 msec.

BRIEF DESCRIPTION OF THE DRAWINGS

FIGS. 3A and 3B are explanatory diagrams of a driving idea in Embodiment 1;

FIGS. 15A and 15B are explanatory diagrams of a driving idea in Embodiments 10 and 11;

FIG. 22 is a diagram for explaining problems in the background-art blink backlight system.

DETAILED DESCRIPTION OF THE INVENTION

The present invention is principally characterized as follows. That is, a liquid crystal display includes a light source of a blink backlight system and a liquid crystal panel for adjusting the amount of light transmitted from the light source. For example, the light source is made of phosphors such as fluorescent materials to be excited by ultraviolet rays to thereby emit light, and the light source has a turned-on state and a turned-off state within one frame. In the liquid crystal display configured thus, the luminance factor area from each phosphor is made substantially equal to that from any other phosphor in at least one of a luminance rise time when the light source changes from the turned-off state to the turned-on state and a luminance fall time when the light source changes from the turned-on state to the turned-off state.

Figure 1:
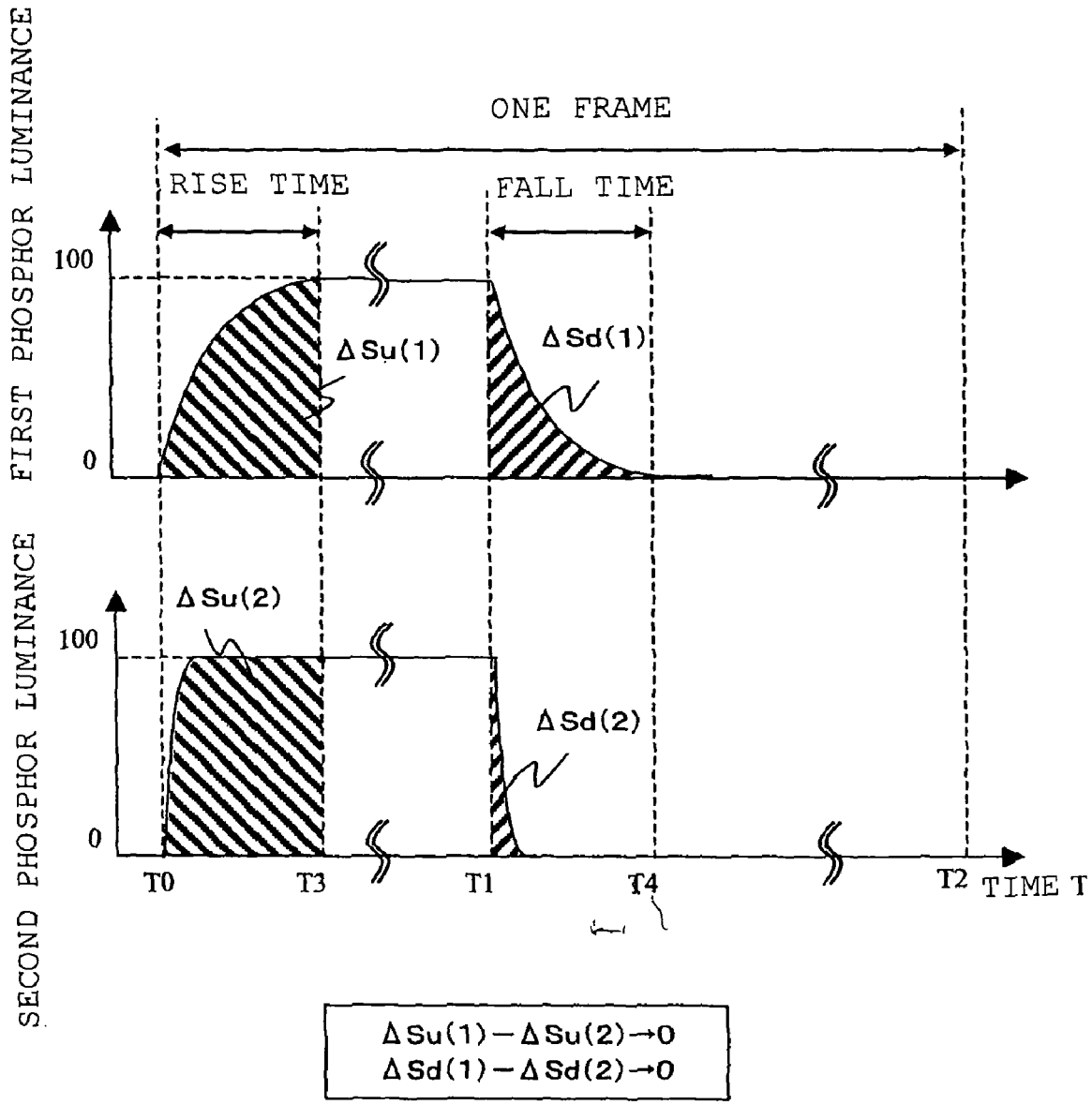
FIG. 1 is an explanatory diagram of a fundamental idea of the present invention.

The principal characteristic will be described in details with reference to FIG. 1. FIG. 1 is a diagram for explaining the fundamental idea of the present invention. In FIG. 1, the ordinate designates a luminance factor standardized with ultimate luminance in each phosphor as 100%. On the other hand, the abscissa designates time T.

Here, the time having been taken since the start of emission of a slow response phosphor (first phosphor in FIG. 1) and till sufficient rise of the luminance of the phosphor is defined as a luminance rise time ($T_0 < T < T_3$). In the same manner, the time having been taken since the start of luminance lowering of the slow response phosphor and till sufficient extinction of the luminance of the phosphor is defined as a luminance fall time ($T_1 < T < T_4$).

In the present invention, as shown in FIG. 1, a luminance factor area $\Delta Su(1)$ obtained by the slow response phosphor (first phosphor) is made substantially equal to a luminance factor area $\Delta Su(2)$ obtained by a fast response phosphor (second phosphor) in the luminance rise time. In the same manner, the luminance factor area $\Delta Sd(1)$ obtained by the slow response phosphor is made substantially equal to the luminance factor area $\Delta Sd(2)$ obtained by the fast response phosphor in the luminance fall time. That is, the above description is intended to satisfy the following (Expression 2) and (Expression 3).

$$\Delta Su(1) - \Delta Su(2) \approx 0 \qquad \text{(Expression 2)}$$

$$\Delta Sd(1) - \Delta Sd(2) \approx 0 \qquad \text{(Expression 3)}$$

Human eyes recognize luminance in a very short time as an integral value thereof. Accordingly, when the areas are made equal to each other as described above, color misregistration which has occurred in the luminance rise time and the luminance fall time in the background art can be improved on a large scale.

Also when a luminance curve (change of luminance factor) per time from each phosphor is made substantially equal to that from any other phosphor, the color misregistration can be improved. This produces the same result as the aforementioned method in which the areas are made equal to each other, as shown in the aforementioned (Expression 2) and (Expression 3).

Next, description will be made on the light source. A light source generally used in a liquid crystal display is generally made of a plurality of light emitting tubes, that is, cold cathode tubes, and each cold cathode tube is provided with a fluorescent material as a phosphor. As shown in the aforementioned FIG. 19, a light source 13 is made of cold cathode tubes 12, and an inverter 8 is connected to each cold cathode tube 12 so as to apply a current to the cold cathode tube. When a current flows into the cold cathode tube, ultraviolet rays are emitted due to discharge gas such as mercury gas confined in the tube. Each fluorescent material (phosphor) is irradiated with the ultraviolet rays so that the fluorescent material emits visible light. That is, the intensity of light emitted from each fluorescent material can be controlled by a current value of a current applied to the light emitting tube provided with the fluorescent material. In the following description, the fluorescent materials will be also referred to as phosphors, and the cold cathode tubes will be also referred to as light emitting tubes.

In order to adjust the luminance of the phosphors by current control and improve color misregistration as in the present invention, it is necessary to take into consideration the kinds of light emitting tubes forming the light source. This is because there is a difference in luminance response speed among the phosphors provided in the light emitting tubes. Here, as the light source, the following four kinds of light sources are assumed.

A first light source is made of light emitting tubes of only one kind, and each light emitting tube is a multicolor light emitting tube having at least three kinds of phosphors. For example, the light source is made of white cold cathode tubes each applied with three kinds of phosphors, that is, red, green and blue phosphors in one and the same cold cathode tube.

A second light source is made of light emitting tubes of at least two kinds, and each light emitting tube is a multicolor light emitting tube having at least two kinds of phosphors. For example, the light source is constituted by two kinds of cold cathode tubes, one of which is a cold cathode tube applied with red and green phosphors and the other of which is a cold cathode tube applied with red and blue phosphors.

A third light source is made of light emitting tubes of at least two kinds, and one of the light emitting tubes is a unicolor light emitting tube having only one kind of phosphor. For example, the light source is constituted by two kinds of cold cathode tubes, one of which is a cold cathode tube applied with a blue phosphor and the other of which is a cold cathode tube applied with red and green phosphors.

A fourth light source is made of light emitting tubes of at least three kinds, and each light emitting tube is a unicolor light emitting tube having only one kind of phosphor. For example, the light source is constituted by three kinds of unicolor cold cathode tubes applied with red, green and blue phosphors individually and respectively.

Description will be made below on a color misregistration improving means using current control in accordance with each kind of light source described above.

Figure 2:
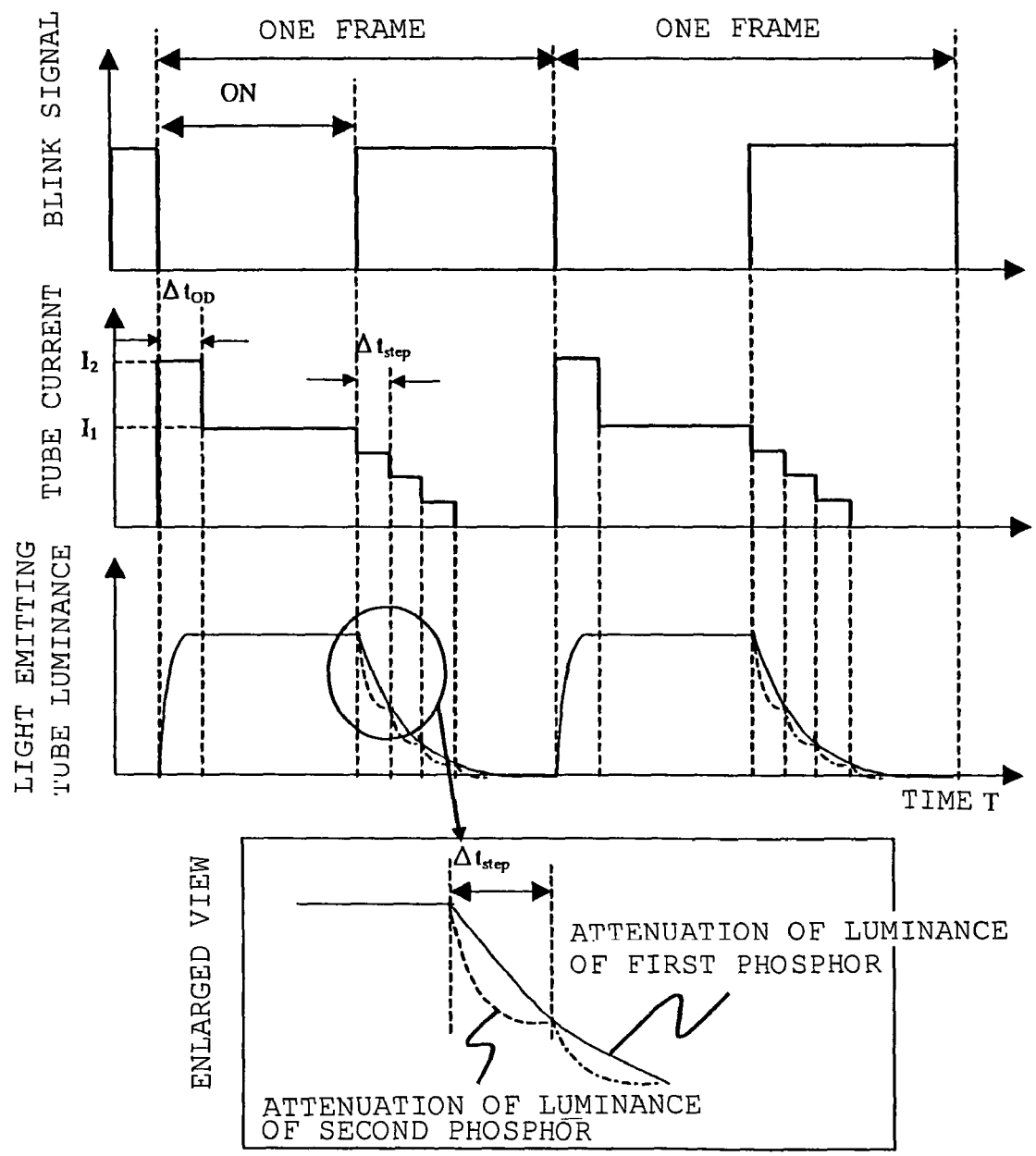
FIG. 2 is an explanatory diagram of a driving waveform and a luminance in Embodiment 1.

In the first light source (such as a white cold cathode tube), fluorescent materials having a large difference in luminance response time from one another are applied into one and the same tube. In such a case, current control shown in FIG. 2 is effective. FIG. 2 is a diagram for explaining the drive waveform and the luminance in an embodiment which will be described later. That is, at the beginning of the luminance rise time, a current value $I_2$ not smaller than a current value $I_1$ necessary for phosphors applied to a light emitting tube to emit light with luminance required in a frame in question is applied to the light emitting tube. On the other hand, in the luminance fall time, a current value attenuated stepwise is applied to the light emitting tube.

In the luminance rise time, when a large current is applied (so-called overdriving is performed) temporarily (in a time $\Delta t_{OD}$), the response time of a slow luminance response phosphor can be accelerated.

It should be noted here that the response time of a fast luminance response phosphor (first phosphor) is also shortened by the large current applied. In this event, as shown in FIG. 3A for explaining a drive idea in Embodiment 1 which will be described later, the luminance of the fast luminance response phosphor overshoots in some time $\Delta t_{OD}$ when the large current is applied. As a result, the difference in luminance factor area (color misregistration) is increased adversely. In order to prevent such an adverse effect from occurring, it is necessary for the time $\Delta t_{OD}$ to satisfy (Expression 4). Here, $\tau_{on}$ designates a time required for the luminance of the fast luminance response phosphor to reach 90% from 0%.

$$\Delta t_{OD} \leq \{-\tau_{on}/\ln 10\} \times \ln(1-1/N) \quad \text{(Expression 4)}$$

where $N = I_2/I_1$.

On such a condition, as shown in FIG. 3B, the large current $I_2$ is switched to the current value $I_1$ as soon as the luminance of the fast luminance response phosphor reaches its intended luminance. Accordingly, there is no fear that there occurs an overshoot phenomenon. Thus, it is possible to obtain an effect of improving color misregistration according to the present invention.

Further, it is desired that the ratio N of the large current $I_2$ to the current $I_1$ is smaller than 6.5. This reason will be described. The signal output frequency from the inverter applying a current to each fluorescent tube ranges from 30 kHz (0.03 msec) to 50 kHz (0.02 msec). It is difficult to set the time $\Delta t_{OD}$ to be not longer than that. Further, the time $\tau_{on}$ is about 0.5 msec in an existing fast luminance response blue fluorescent material. From this fact, in order to satisfy (Expression 4), it is desired that the ratio N is not larger than 6.5.

On the other hand, it is desired that a step time width $\Delta t_{step}$ of the current value of the stepwise attenuated current applied in the luminance fall time is set to be shorter than the luminance fall response time of the slow luminance response phosphor and to be longer than the luminance fall response time of the fast luminance response phosphor. Here, the luminance fall response time is defined as time required for the luminance of the fluorescent material of each phosphor to reach 10% from 100%. Due to such setting, the luminance of the fast luminance response fluorescent material is held in accordance with the current held stepwise. As a result, the luminance is attenuated in the course shown by the broken line in the enlarged view of FIG. 2. Thus, the difference in luminance factor area can be reduced in comparison with that in the background art.

The drive with the stepwise attenuated current in the luminance fall time as shown in FIG. 2 can be also applied to the luminance rise time. That is, it is desired that a step time width $\Delta t_{step}$ of the current value of the stepwise increased current applied in the luminance rise time is set to be longer than the luminance rise response time of the slow luminance response phosphor. Here, the luminance rise response time is defined as time required for the luminance of the fluorescent material of each phosphor to reach 90% from 0%. Due to such setting, the luminance of the fast luminance response fluorescent material is held in accordance with the current held stepwise. Thus, the difference in luminance factor area can be reduced.

Next, description will be made on current drive in the second light source and the third light source. In these light sources, a fast luminance response fluorescent material and a slow luminance response fluorescent material are applied to different tubes respectively so that the tubes can be current-controlled independently of each other. Accordingly, when two or more kinds of fluorescent materials are applied to one and the same tube, it is desired that fluorescent materials whose luminance rise response times and luminance fall response times are as close to each other as possible are applied.

In such a light source, roughly speaking, the present invention provides two means for improving color misregistration in the luminance rise time and the luminance fall time.

One of them is a means for making a change in luminance factor from each fluorescent material equal to that from any other fluorescent material. The other means is a means for making only the luminance factor area of each fluorescent material equal to that of any other fluorescent material without making their luminance factor changes equal to each other, so as to compensate luminance sensible by human eyes.

First, description will be made on improvement of color misregistration using the means for making a change in luminance factor from each fluorescent material equal to that from any other fluorescent material.

Roughly speaking, there are two methods for improving color misregistration in the luminance rise time in the light sources described above. One of the methods is a method in which the luminance response of a fast luminance response fluorescent material is adjusted to the luminance response of a slow luminance response fluorescent material. The other method is a method in which the luminance response of the slow luminance response fluorescent material is accelerated.

Figure 6:
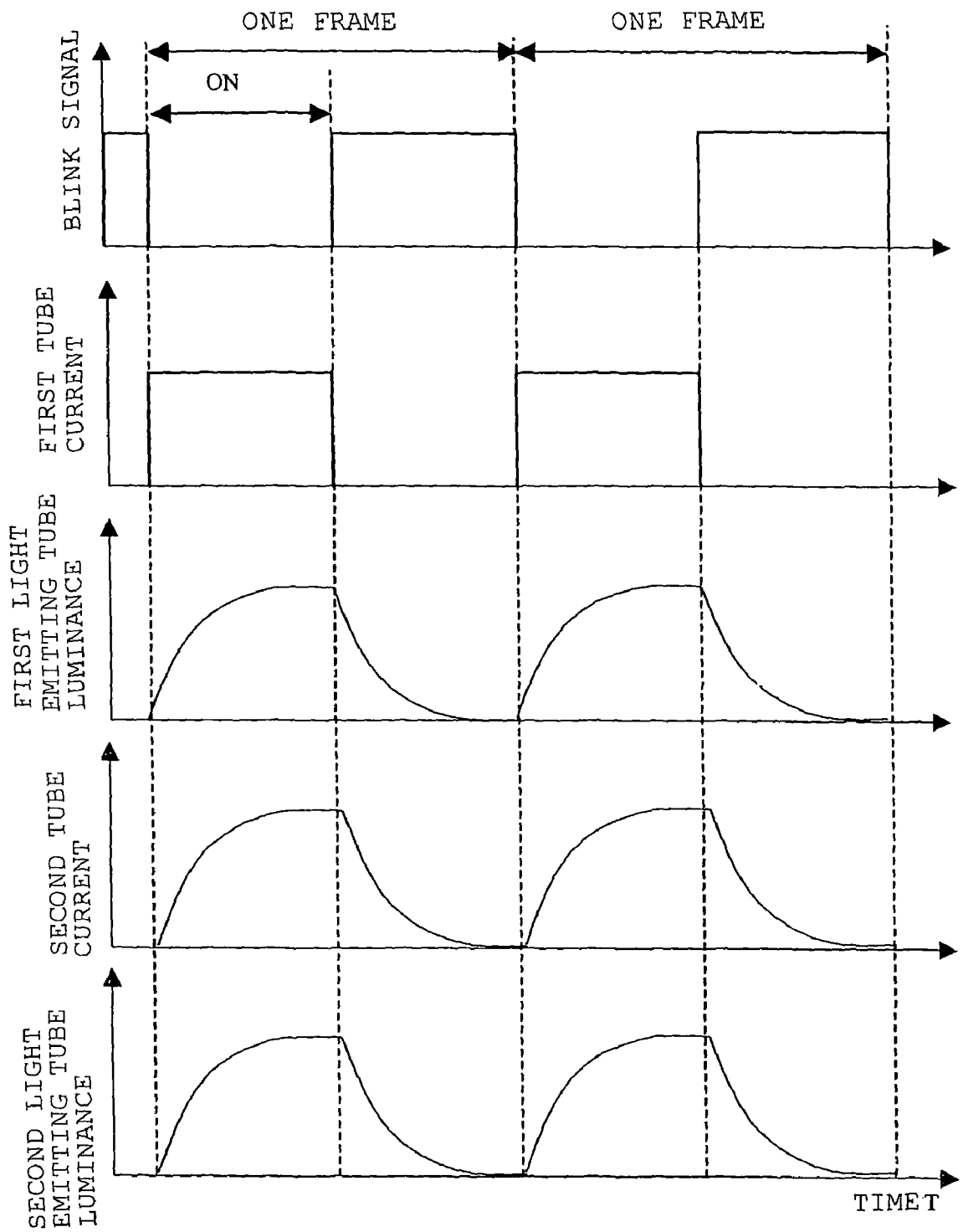
FIG. 6 is a driving waveform chart in Embodiment 3.

In order to slow the luminance response of the fast luminance response fluorescent material, for example, there is a means for gradually increasing a current applied to a second fluorescent tube (light emitting tube) applied with the fast luminance response fluorescent material as shown in FIG. 6. Thus, the luminance factor change of the fast luminance response fluorescent material can be made substantially equal to that of the slow luminance response fluorescent material, so that color misregistration can be improved.

Figure 7:
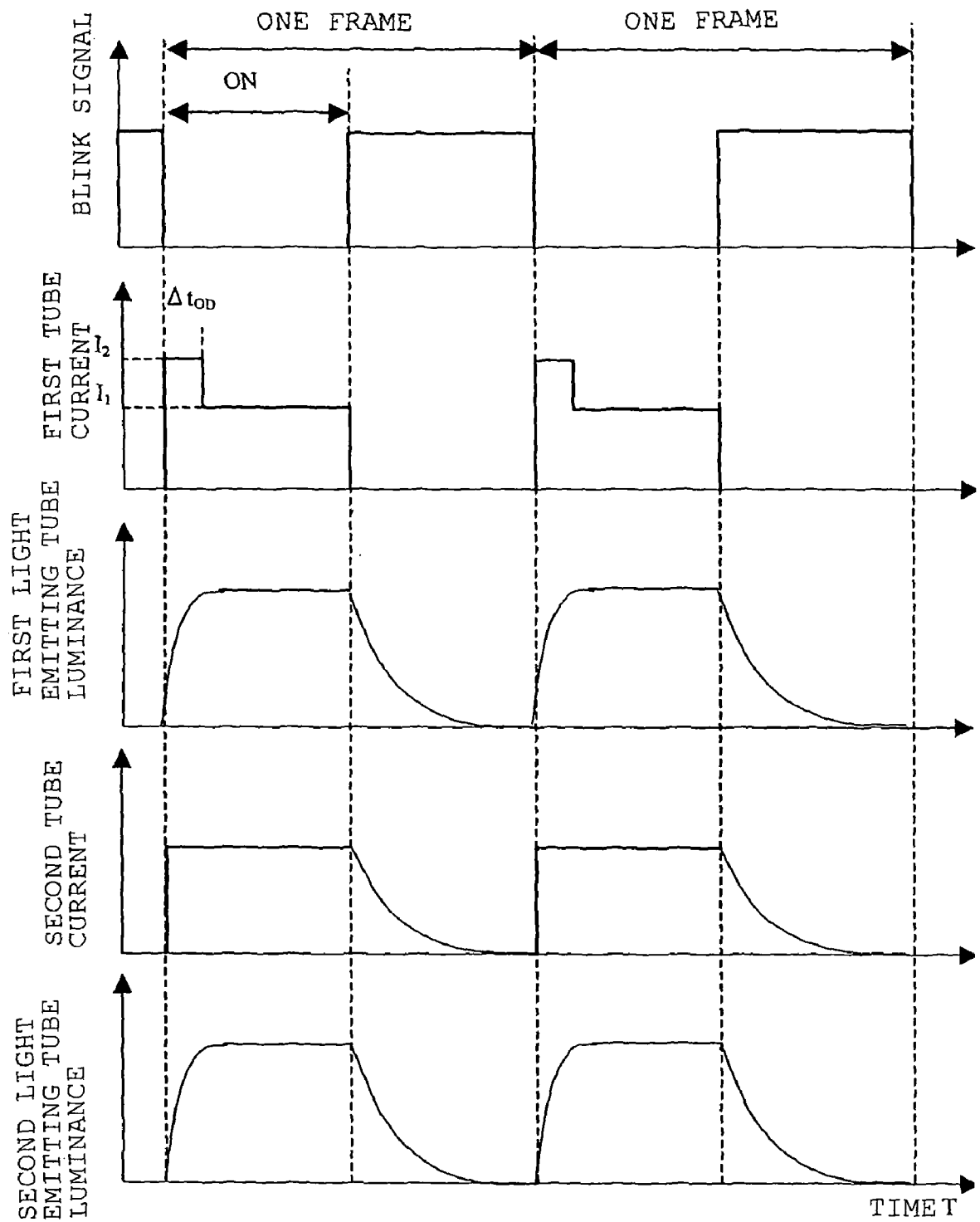
FIG. 7 is a driving waveform chart in Embodiment 5.

On the other hand, in order to accelerate the luminance response of the slow luminance response fluorescent material, for example, a current value $I_2$ not smaller than a current value $I_1$ necessary to emit light with predetermined luminance in a frame may be applied in the beginning of the luminance rise time as shown in FIG. 7.

Figure 8:
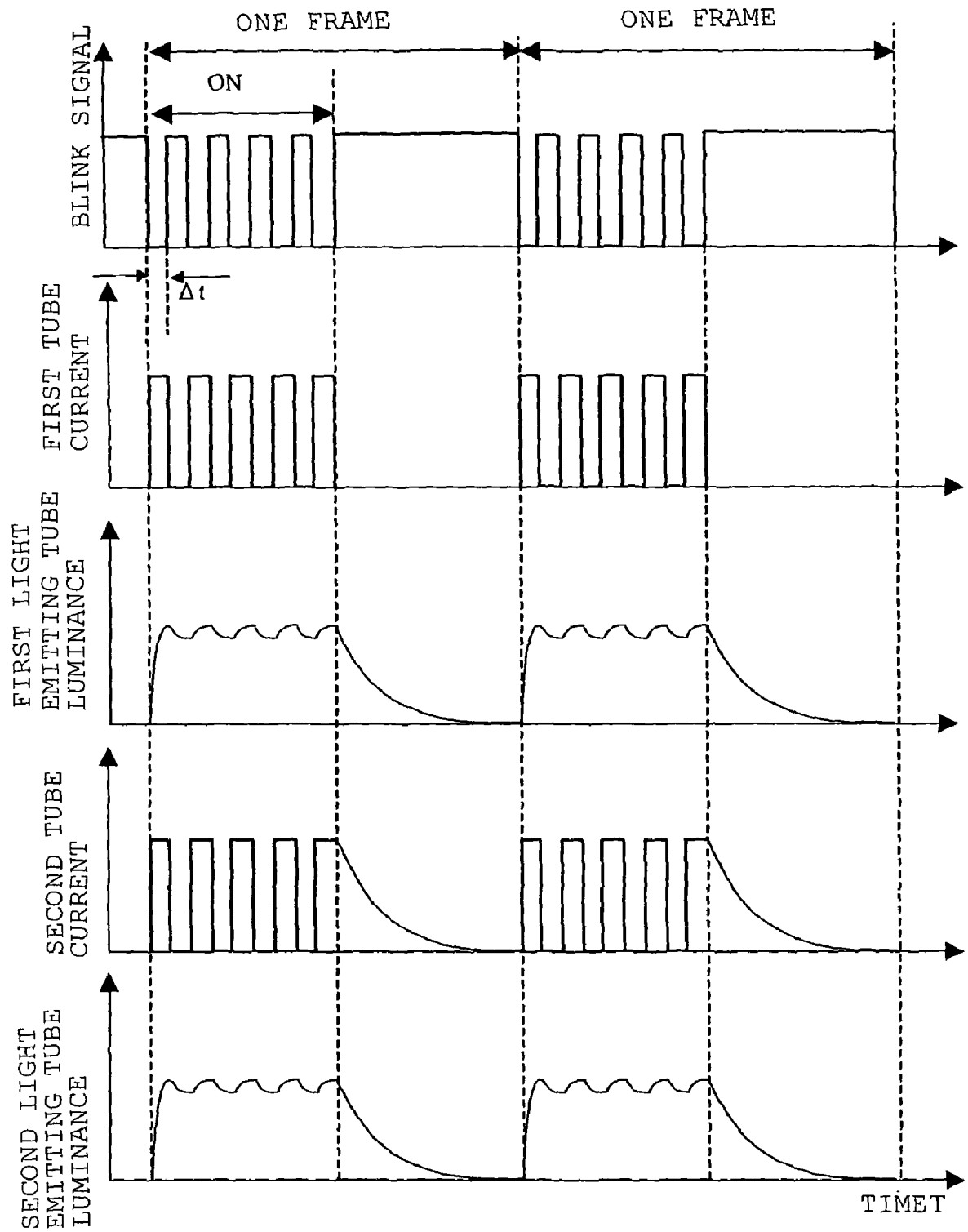
FIG. 8 is a driving waveform chart in Embodiment 6.

Further, in order to accelerate the apparent luminance rise response speed, a means shown in FIG. 8 is also effective. In this case, the current value to be applied the fluorescent tube is formed into a rectangular shape. As shown in FIG. 8, when the current value $I_2$ is applied for a long time, the luminance of the fluorescent material will reach a second ultimate luminance. However, when the rectangular current is applied thus, the luminance is lowered as soon as the current value is turned off. Accordingly, the luminance can reach only a first ultimate luminance finally. In this case, the apparent luminance response time is shortened.

Figure 10:
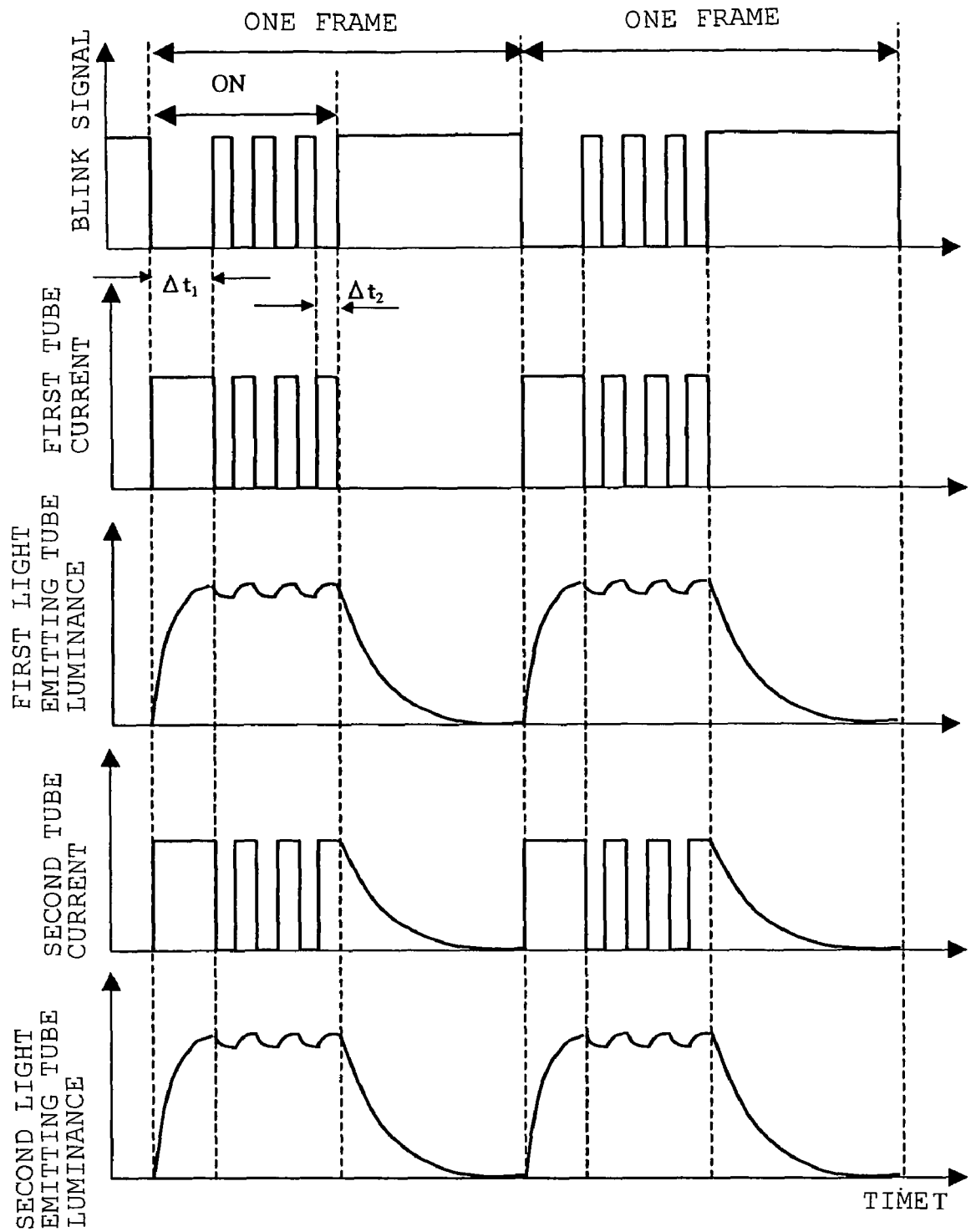
FIG. 10 is a driving waveform chart in Embodiment 7.

In addition, as shown in FIG. 8, when driving is performed with the current having a rectangular waveform, the luminance becomes lower than when the original current value is applied for a long time. In order to suppress the lowering of the luminance as well as possible, the time width of the rectangular waveform for driving may be set to be long only at the beginning as shown in FIG. 10.

When driving is performed thus, it is desired that the time width Δt is set to be not shorter than 300 Hz (not longer than 3.3 msec). This is because it is said that human beings cannot recognize a difference between light waveforms within 1/300 second. When the time width Δt is not longer than 300 Hz, the change in luminance can be recognized, resulting in flicker causing deterioration of image quality.

On the other hand, in order to improve color misregistration in the luminance fall time, there is a means for slowing the response of the fast luminance response fluorescent material so as to adjust the response to that of the slow luminance response fluorescent material. That is, a current applied to a fluorescent tube applied with the fast luminance response fluorescent material is attenuated gradually as shown in FIG. 6 or the like.

Next, as another color misregistration improving means, description will be made on a means for compensating a luminance factor area.

FIGS. 15A and 15B are diagrams showing the idea of driving according to an embodiment. As shown in FIG. 15A, in the luminance rise time, time of start of application of a current to each light emitting tube having a fast luminance response fluorescent material is controlled to be delayed by a predetermined time $\Delta t_i$ with respect to time of start of application of a current to each light emitting tube having a slow luminance response fluorescent material, so that the luminance factor area of the fast luminance response fluorescent material is substantially equal to the luminance factor area of the slow luminance response fluorescent material.

Also in the luminance fall time, the current is controlled to delay the timing of termination of application of the current by a predetermined time $\Delta t_f$ so that the luminance factor areas of the fluorescent materials are substantially equal to each other during the luminance fall time.

Due such a means, color misregistration areas ΔS1 and ΔS2 are compensated so that the color misregistration can be improved. The same thing can be also applied to the fall time. Further, it is said that 300 or more pulses per second cannot be output from a nerve cell which is an output cell of a human retina, as described previously. When the luminance rise time and the luminance fall time are not longer than 3.3 msec, this effect of improving color misregistration is large. In order to make the luminance rise time and the luminance fall time not longer than 3.3 msec, the luminance rise response time and the luminance fall response time of a fluorescent material whose luminance response speed is the slowest have to be not longer than 3.3 msec.

Further, when there is a large difference in luminance response time between the fast response fluorescent material and the slow response fluorescent material, the delay times $\Delta t_i$ and $\Delta t_f$ are made almost half as long as the luminance rise time and the luminance fall time of the slow response fluorescent material respectively. Thus, the areas can be compensated easily. When the luminance rise time and the luminance fall time are 3.3 msec, it is desired that the delay times $\Delta t_i$ and $\Delta t_f$ are not longer than 1.7 msec.

Specific embodiments of the present invention will be described below. However, the present invention is not limited to the following embodiments.

Embodiment 1

Figure 19:
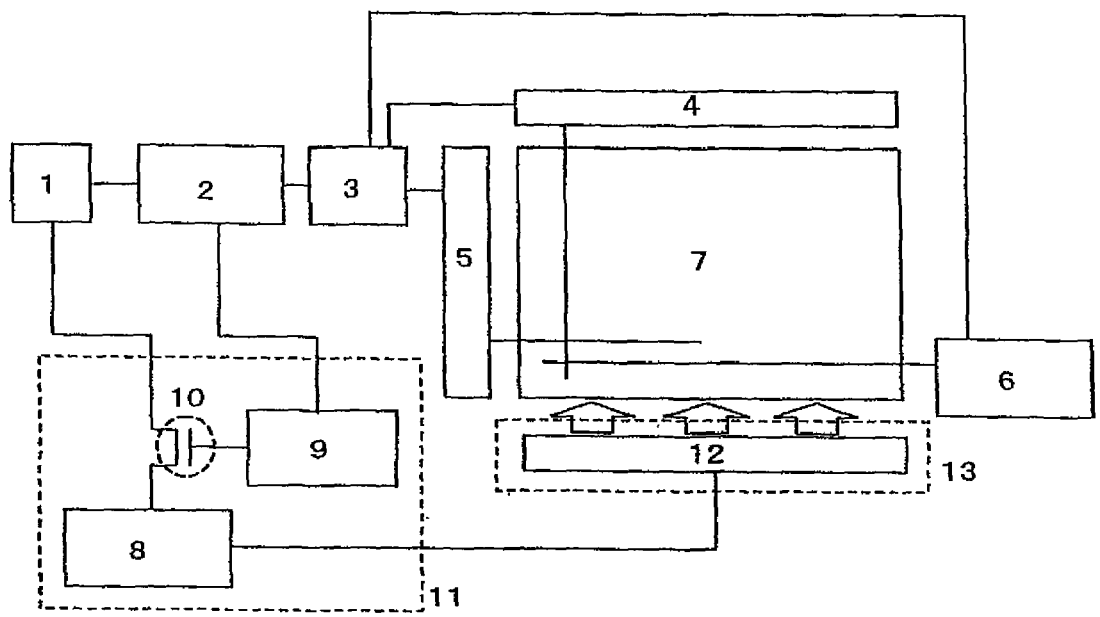
FIG. 19 is a schematic diagram showing a configuration of a liquid crystal display in the background art.
Figure 20:
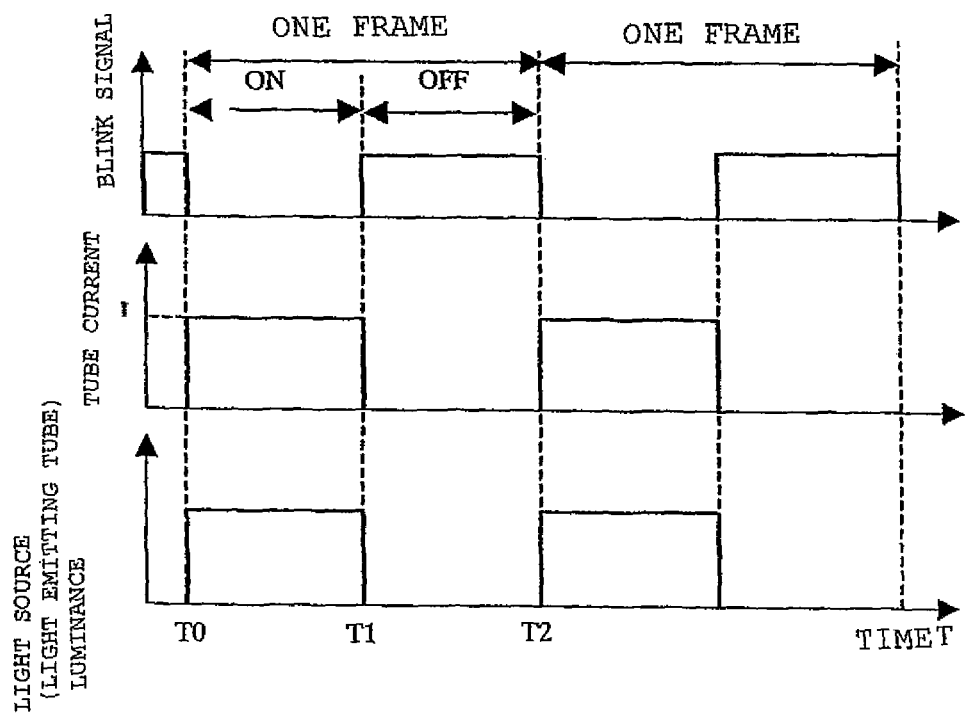
FIG. 20 is a driving waveform chart in a background-art blink backlight system.
Figure 21:
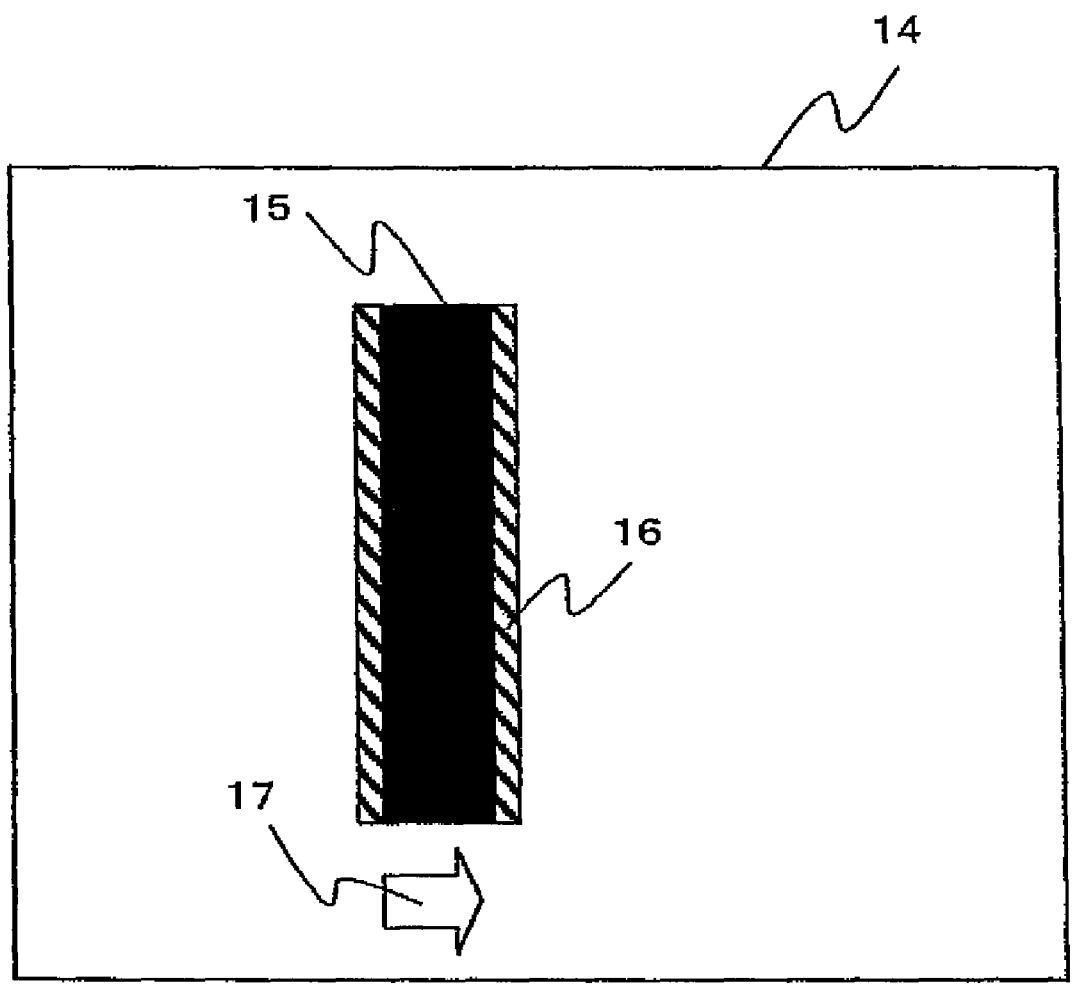
FIG. 21 is a display pattern view at the time of evaluation of color misregistration.

The outline of a liquid crystal display according to this embodiment is fundamentally similar to the background-art liquid crystal display shown in FIG. 19, but largely different from the background art in the waveform of a current to control the luminance of each fluorescent tube. FIG. 2 shows a blink signal waveform, a tube current waveform and a light emitting tube luminance response waveform in this embodiment.

In this embodiment, one kind of multicolor light source is used. Specifically, cold cathode fluorescent tubes internally applied with fluorescent materials of three colors (red, green and blue) are used as the light source. The waveform of a current applied to each of the cold cathode tubes is shown in FIG. 2.

Here, $(Ba,Sr)MgAl_{10}O_{17}$:Eu, $Y_2O_3$:Eu and $LaPO_4$:Tb,Ce are used as blue, red and green fluorescent materials respectively. The luminance response speeds of these fluorescent materials are about 0.5 msec, 3 msec and 7 msec respectively.

As shown in FIG. 2, at the beginning of a lighting period in one frame, a large current value $I_2$ not smaller than a current value $I_1$ required for predetermined luminance is applied for a predetermined time ($\Delta t_{OD}$). In this embodiment, those currents are set as $I_1=6$ mA and $I_2=12$ mA. At this time, in the luminance rise time, the response of the red and green fluorescent materials become faster apparently so that the difference of the red and green fluorescent materials in luminance area from the blue fluorescent material can be reduced. Thus, color misregistration in the luminance rise time can be improved. In this event, however, the luminance of the blue fluorescent material whose luminance response speed is the fastest may overshoot depending on some size of the time $\Delta t_{OD}$ so that the light is white with a bluish tone due to the color misregistration, as described previously. Accordingly, in this embodiment, the time $\Delta t_{OD}$ is set as $\Delta t_{OD}=0.15$ msec in accordance with the aforementioned (Expression 4).

On the other hand, in the luminance fall time, the current value is attenuated stepwise. In this event, the current value is set so that its step current width has a time width $\Delta t_{step}$. It is important to set the time width $\Delta t_{step}$ to be shorter than the response time of the green fluorescent material and to be longer than the response time of the blue fluorescent material. By such setting, the luminance of the green fluorescent material is attenuated in accordance with its own luminance relaxation time constant, while the luminance of the blue and red fluorescent materials is once attenuated in accordance with their own luminance relaxation time constants and then the luminance is kept until the next current value attenuation time because the current value has a stepped shape, as shown in the enlarged diagram of FIG. 2. Thus, the difference between the area obtained in the luminance fall time by the slow response fluorescent material and the area obtained likewise by the fast response fluorescent material can be reduced as compared with that in the background art. In this embodiment, the time $\Delta t_{step}$ is set as $\Delta t_{step}=3$ msec. As a result, color misregistration can be improved in the luminance fall time.

By the means having been described above, color misregistration can be improved in the luminance rise time and the luminance fall time. Thus, it is possible to a high-quality liquid crystal display supporting moving images.

Embodiment 2

This embodiment is different from Embodiment 1 only in the waveform of a current to control the luminance of each fluorescent tube. Particularly the current waveform is different in the luminance rise time. The blink waveform, the tube current waveform and the light emitting tube luminance response waveform in this embodiment will be described with reference to FIG. 4. In FIG. 5, the reference numeral 12A represents a first light emitting tube; 12B, a second light emitting tube; and 8A and 8B, inverters for driving the first light emitting tube 12A and the second light emitting tube 12B respectively. The same reference numerals as those in FIG. 19 correspond to the same parts as those in FIG. 19.

Figure 4:
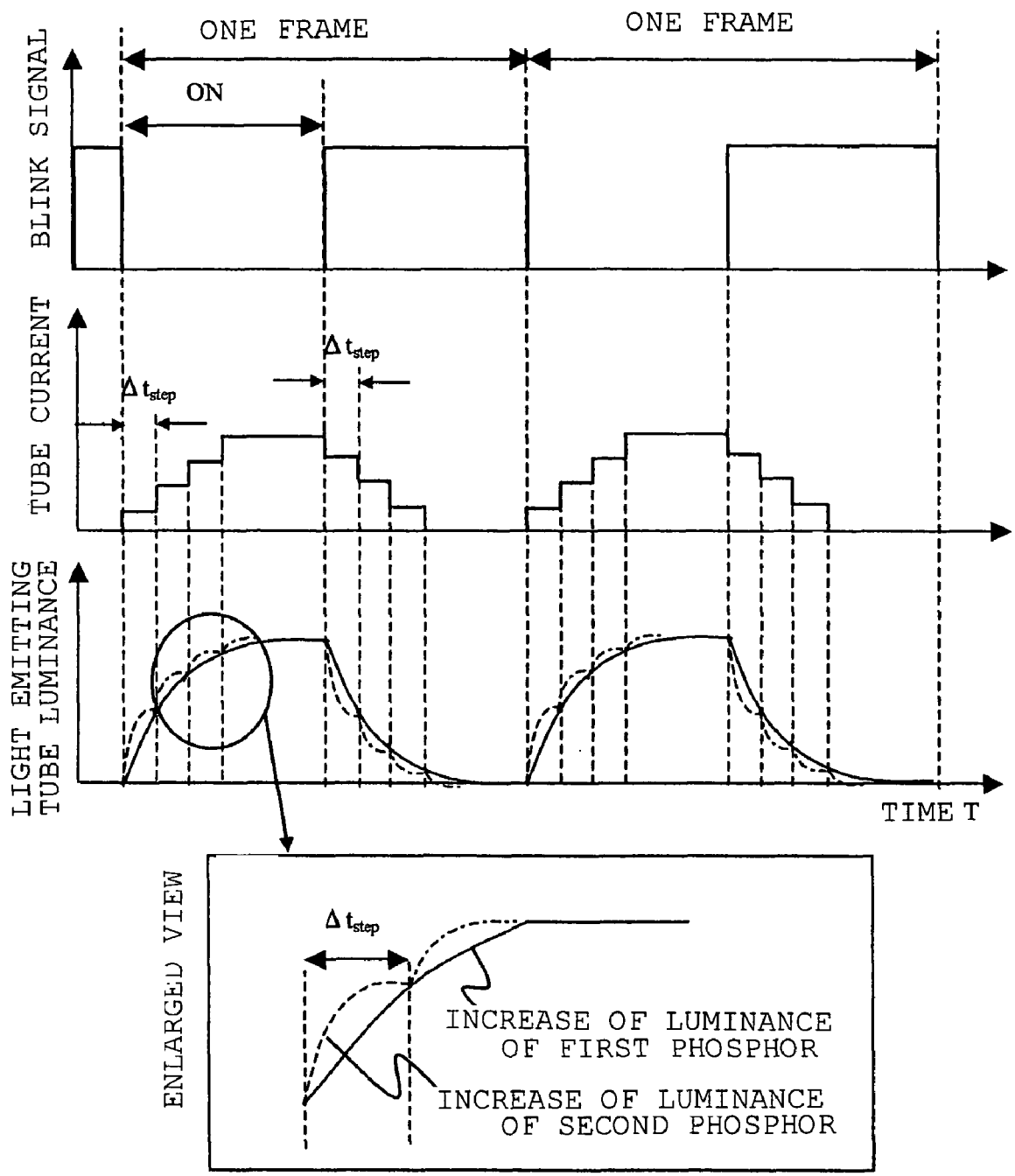
FIG. 4 is an explanatory diagram of a driving waveform and a luminance in Embodiment 2.
Figure 5:
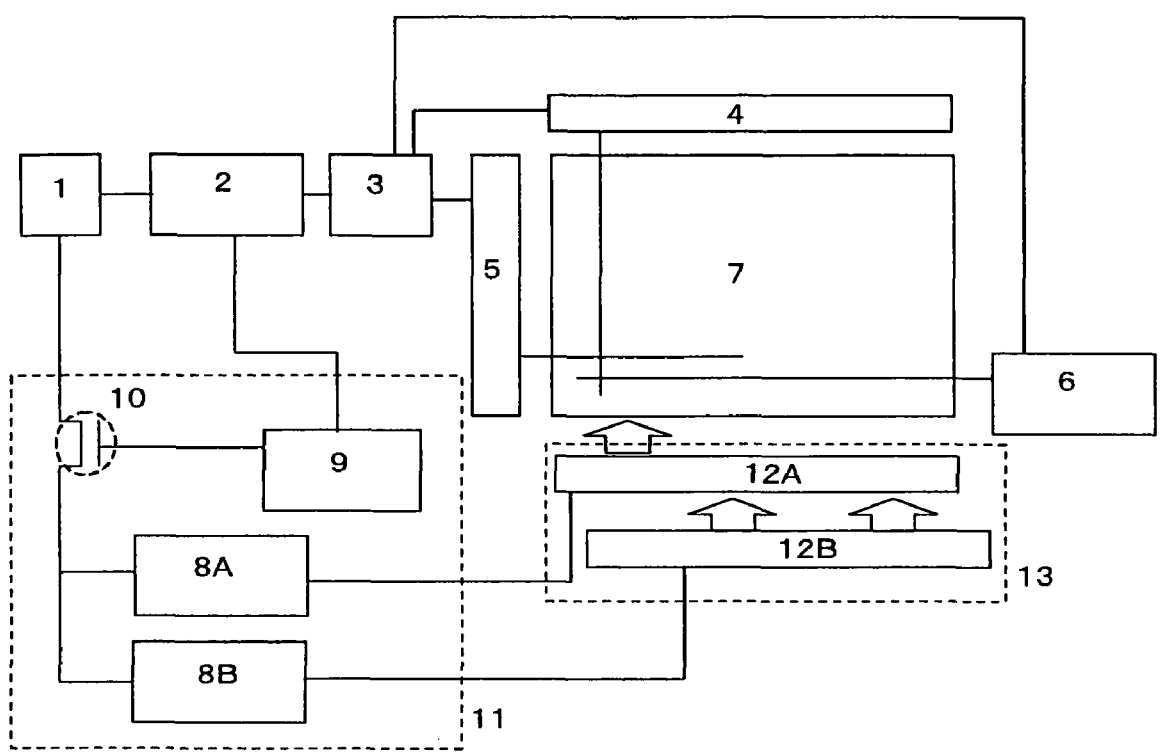
FIG. 5 is a schematic diagram showing a configuration of a liquid crystal display according to Embodiment 3.

As shown in FIG. 4, in the luminance rise time, the current value is increased stepwise. In this event, the current value is set so that the step width of the current value has a time width $\Delta t_{step}$. It is important to set the time width $\Delta t_{step}$ to be shorter than the response time of the green fluorescent material (first phosphor in FIG. 4) and to be longer than the response time of the blue fluorescent material (second phosphor in FIG. 4).

By setting the response time thus, the luminance of the green fluorescent material is increased in accordance with its own luminance relaxation time constant, while the luminance of the blue and red fluorescent materials is once increased in accordance with their own luminance relaxation time constants and then the luminance is kept until the next current value increase time because the current value has a stepped shape, as shown in the enlarged diagram of FIG. 4.

Thus, the difference between the area obtained in the luminance rise time by the slow response fluorescent material and the area obtained likewise by the fast response fluorescent material can be reduced as compared with that in the background art.

In this embodiment, the time width $\Delta t_{step}$ is set as $\Delta t_{step}=3$ msec. As a result, color misregistration can be improved in the luminance rise time. Thus, it is possible to a high-quality liquid crystal display supporting moving images.

Embodiment 3

The outline of a liquid crystal display according to this embodiment will be described with reference to the aforementioned FIG. 5. In the liquid crystal display according to this embodiment, two kinds of light emitting tubes, that is, a first light emitting tube 12A and a second light emitting tube 12B are used. These two kinds of light emitting tubes are connected to different inverter circuits 8 (8A and 8B), and controlled by one and the same blink signal from a blink signal generation circuit 9 shared by the inverter circuits 8.

The first light emitting tube 12A is applied with a red fluorescent material and a green fluorescent material having slow response speeds and having almost the same response time. On the other hand, the second light emitting tube 12B is applied with a blue fluorescent material having a fast response speed. Here, $(Ba,Sr)MgAl_{10}O_{17}$:Eu, $Y_2O_3$:Eu and $LaPO_4$:Tb,Ce are used as the blue, red and green fluorescent materials respectively.

This embodiment will be described with reference to FIG. 6. FIG. 6 shows the blink signal, the waveforms of currents applied to the cold cathode tubes, the first light emitting tube luminance and the second light emitting tube luminance. In accordance with the ON timing of the blink signal, a substantially rectangular current is applied to the first light emitting tube 12A. In accordance therewith, the luminance of each slow response fluorescent material generally increases and reaches a predetermined luminance value. On the other hand, in the same timing, the amplitude of the current to the second light emitting tube 12B is increased gradually so that the rate of change in luminance of the second light emitting tube 12B is made substantially equal to that from the first light emitting tube 12A. Thus, color misregistration can be improved in the luminance rise time.

On the other hand, also in the luminance fall time, the current applied to the first light emitting tube 12A is turned off in accordance with the OFF timing of the blink signal. Thus, the luminance of each slow response fluorescent material is attenuated gradually. On the other hand, the current to the second light emitting tube 12B begins to be attenuated at the OFF timing of the blink signal so that the amplitude of the current is reduced gradually. Thus, the luminance of the blue fluorescent material having a fast response speed can be attenuated gradually so that the attenuation of the second light emitting tube can be made substantially equal to that of the first light emitting tube.

By the means having been described above, color misregistration can be improved in the luminance rise time and the luminance fall time. Thus, it is possible to a high-quality liquid crystal display supporting moving images.

Embodiment 4

The configuration of a liquid crystal display according to this embodiment is similar to that in FIG. 5. A green fluorescent material in this embodiment is different from that in Embodiment 3. Aluminate-based $SrAl_2O_4$:Eu is used as the green fluorescent material. This fluorescent material has a fast luminance response speed of about 0.5 msec, which is as fast as that of the blue fluorescent material $(Ba,Sr)MgAl_{10}O_{17}$:Eu.

The first light emitting tube 12A is applied with the green fluorescent material and the blue fluorescent material. On the other hand, the second light emitting tube 12B is applied with only the red fluorescent material.

These two kinds of tubes are current-controlled independently of each other in the same manner as in Embodiment 3. Thus, the difference in luminance area can be reduced in the luminance rise time and the luminance fall time.

Embodiment 5

The configuration of a liquid crystal display according to this embodiment is also similar to that in FIG. 5. This embodiment is the same as Embodiment 3, except the waveform of a current applied to each fluorescent tube. The blink signal, the waveforms of currents and the luminance responses in this embodiment will be described with reference to FIG. 7.

In the luminance rise time, a large current value $I_2$ not smaller than a current value $I_1$ required for predetermined luminance is applied, for a predetermined time, to the first fluorescent tube 12A applied with a slow response fluorescent material. Here, the currents are set as $I_1$=6 mA and $I_2$=12 mA.

Thus, the luminance response time of the slow response fluorescent tube is shortened apparently. On the other hand, in the luminance fall time, the attenuation of luminance of the slow response fluorescent tube depends on the luminance relaxation characteristic of the fluorescent material thereof. It is therefore difficult to shorten the response time of the slow luminance response fluorescent tube by current control.

It is therefore effective to perform current control to slow the luminance response of the second fluorescent tube 12B applied with a fast response fluorescent material. As shown in FIG. 7, in the luminance fall time, the current applied to the second fluorescent tube 12B is attenuated gradually in accordance with the OFF timing of the blink signal so that the luminance response of the second fluorescent tube 12B can be made substantially equal to that of the first fluorescent tube 12A.

In such a manner, color misregistration can be improved in the luminance rise time and the luminance fall time. Thus, it is possible to a high-quality liquid crystal display supporting moving images.

Embodiment 6

The configuration of a liquid crystal display according to this embodiment is also similar to that in FIG. 5. This embodiment is the same as Embodiment 3, except the waveform of a current applied to each fluorescent tube. The blink signal, the waveforms of currents and the luminance responses in this embodiment will be described with reference to FIGS. 8 and 9.

Figure 9:
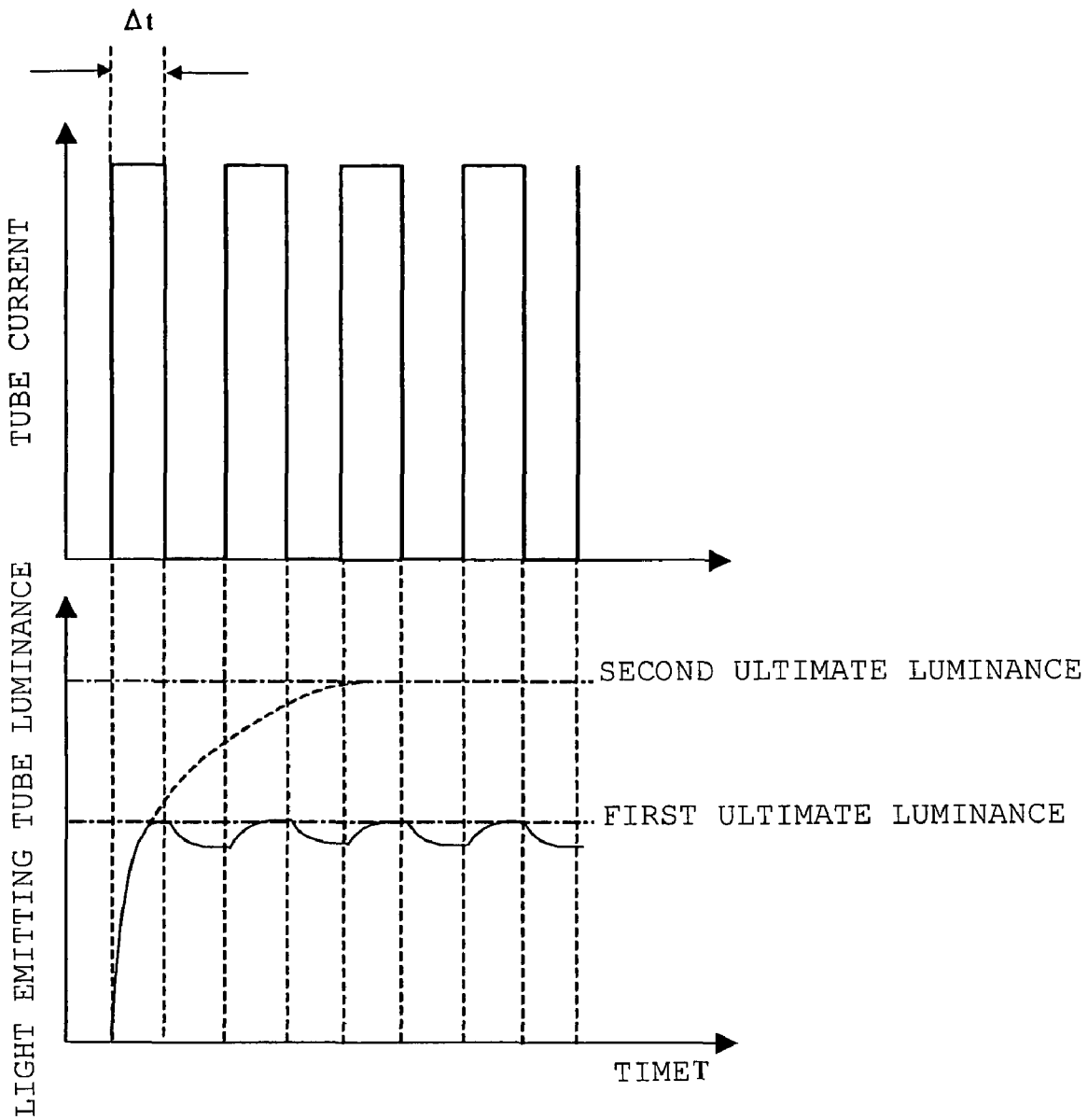
FIG. 9 is a diagram of a driving idea in Embodiments 6 and 7.

In this embodiment, the blink signal is driven at a high frequency in a lighting period. A current is also applied to each fluorescent tube at a high frequency in sync with the high-frequency blink signal. As shown in FIG. 9, when a fixed current is applied continuously without being driven at a high frequency, the luminance of each fluorescent tube might reach its second ultimate luminance. However, as soon as the current is turned off in a shorter time than the response time of the fluorescent material, the luminance begins to drop down. Further, when the current is turned on in a shorter time than the attenuation response time of the fluorescent material, the luminance begins to increase again. This driving is repeated so that the luminance of the fluorescent tube lands up on its first ultimate luminance averagely. Here, the current is driven like a rectangular waveform at a frequency of 10 kHz (0.1 msec).

Such a drive can make the apparent response time shorter than the original response time. Thus, in the luminance rise time, the luminance of the slow response fluorescent tube can be made substantially equal to the luminance of the fast response fluorescent tube so that color registration can be improved.

On the other hand, in the luminance fall time, the response time of the fast response fluorescent tube is slowed by the current applied thereto. Thus, the luminance of the fast response fluorescent tube can be made substantially equal to the luminance of the slow response fluorescent tube so that color registration can be improved.

Embodiment 7

The configuration of a liquid crystal display according to this embodiment is also similar to that in FIG. 5. This embodiment is the same as Embodiment 6, except the time width of a current driven at a high frequency. The blink signal, the waveforms of currents and the luminance responses in this embodiment will be described with reference to FIG. 10. As shown in FIG. 10, the currents are driven at a high frequency in the ON period, similarly to Embodiment 6. However, the time width of each current is varied between the beginning of the ON period and the rest of the ON period. For example, the time widths are set as $\Delta t_1$=1 msec and $\Delta t_2$=0.1 msec By such current control, the luminance can be enhanced while color misregistration is improved, as compared with Embodiment 6.

Embodiment 8

Figure 11:
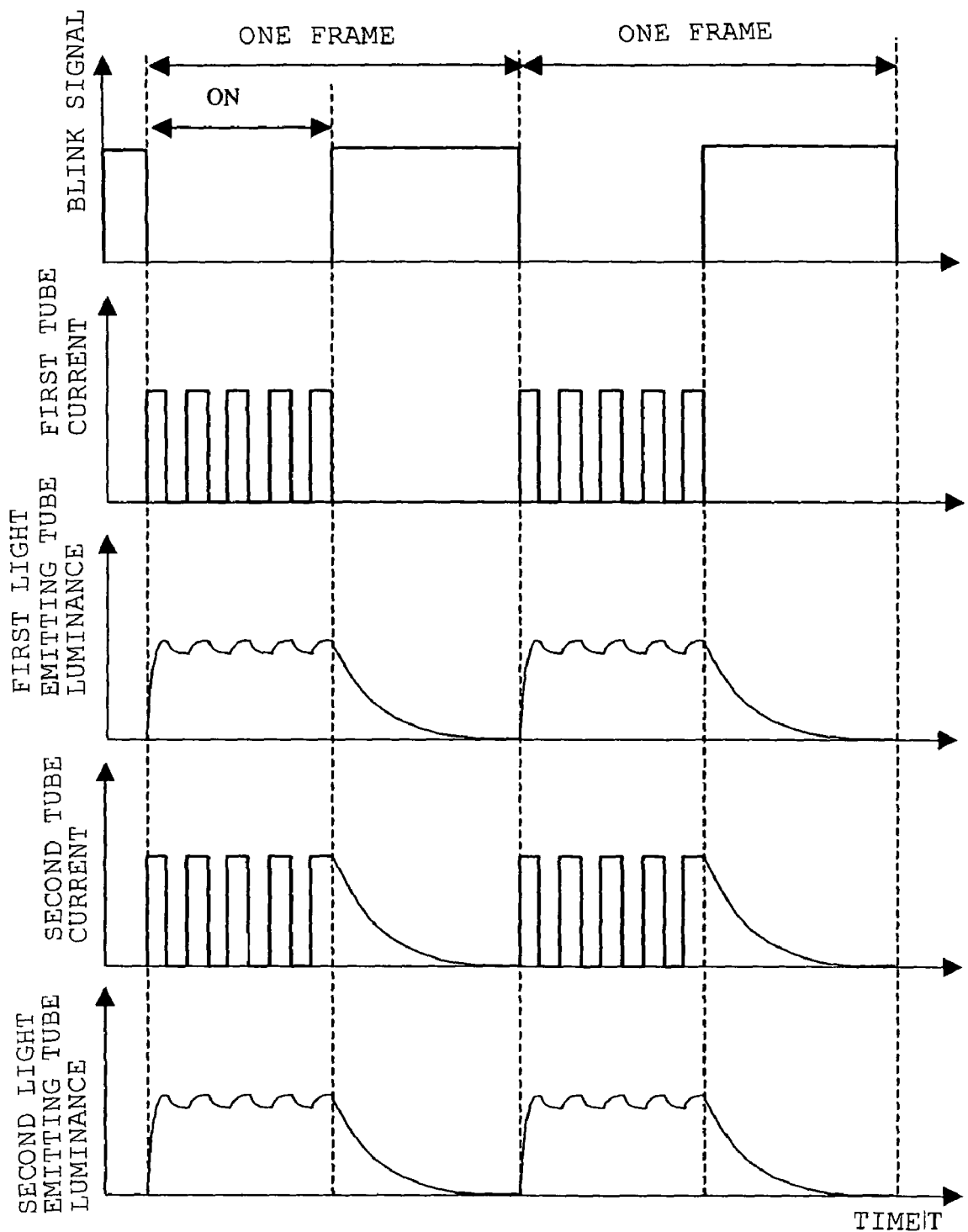
FIG. 11 is a driving waveform chart in Embodiment 8.

The configuration of a liquid crystal display according to this embodiment is also similar to that in FIG. 5. This embodiment is the same as Embodiment 6, except the blink signal. The blink signal, the waveforms of currents and the luminance responses in this embodiment will be described with reference to FIG. 11. When the blink signal is in an ON state, a high-frequency current waveform is output from each inverter circuit. Thus, color misregistration can be improved as described above in Embodiment 6.

In this embodiment, the number of times of switching the blink signal is reduced as compared with that in Embodiment 6. Thus, the power consumption can be reduced.

Embodiment 9

Figure 12:
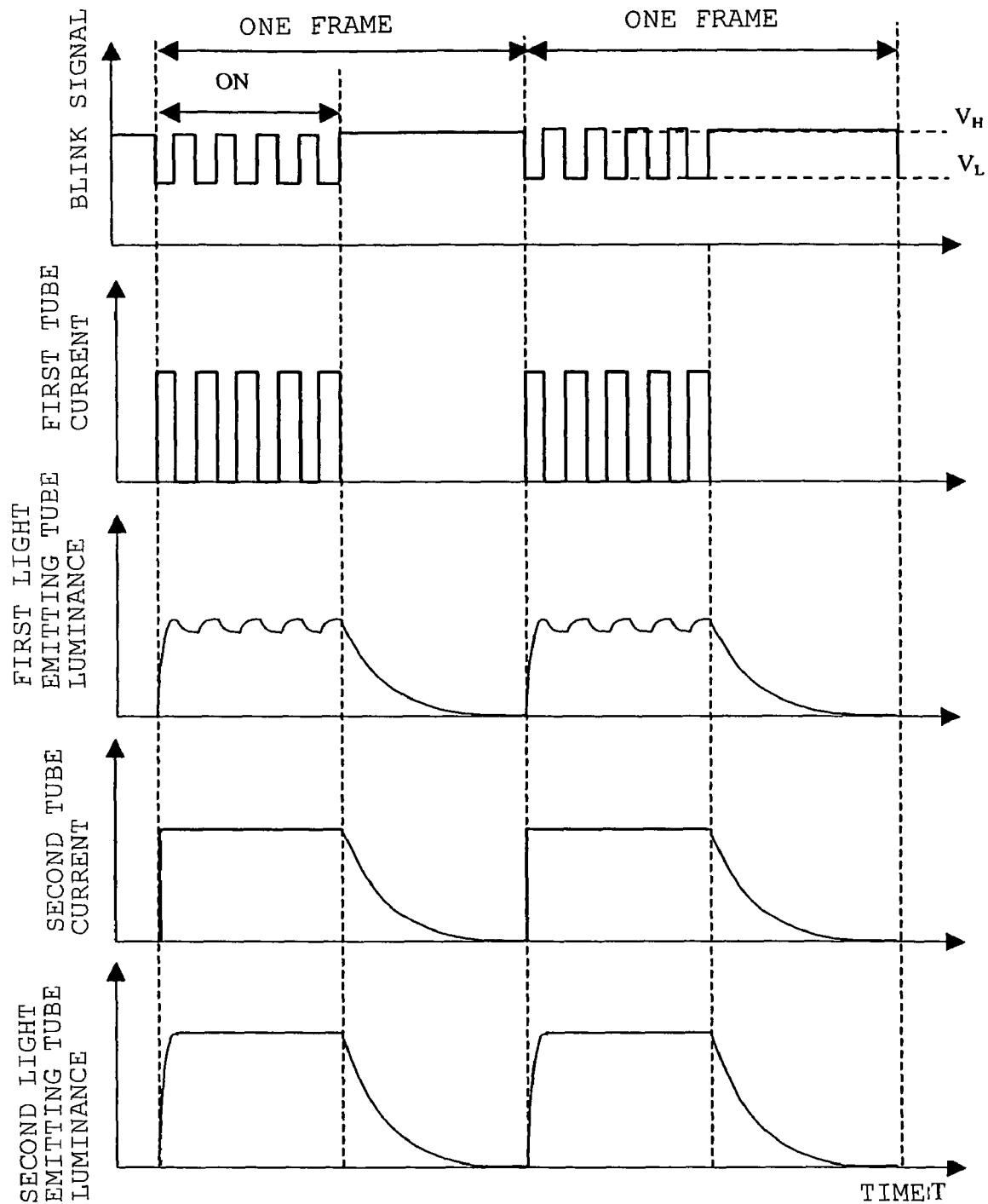
FIG. 12 is a driving waveform chart in Embodiment 9.

The configuration of a liquid crystal display according to this embodiment is also similar to that in FIG. 5. This embodiment is the same as Embodiment 6, except the blink signal waveform and the characteristic of a switching device put between each fluorescent tube and its corresponding inverter circuit. The blink signal, the waveforms of currents and the luminance responses in this embodiment will be described with reference to FIG. 12. In Embodiment 6, as is understood from FIG. 9, each tube is used with luminance that has not yet reached a luminance value the tube should reach originally. Thus, there is a fear that the efficiency is degraded. Therefore, in order to improve the efficiency, as shown in FIG. 12, the characteristic of a first switching device connected to the first fluorescent tube is made different from the characteristic of a second switching device connected to the second fluorescent tube, while the blink signal is driven at a high frequency between two voltages $V_L$ and $V_H$ in the ON period of the blink signal.

The threshold voltage of the first switching device is higher than $V_L$. Thus, the first switching device has a characteristic that no current flows when the voltage is lower than $V_L$. On the other hand, the threshold voltage of the second switching device is set to be not higher than $V_L$. Thus, the second switching device has a characteristic that a current always flows when the voltage is not lower than $V_L$. According to the switching devices configured thus, the current to the first fluorescent tube is driven at a high frequency in accordance with the illustrated blink signal. Based on the same idea as those in Embodiments 4 and 5, in the luminance rise time, the response speed is accelerated so that color misregistration can be improved. On the other hand, the current to the second fluorescent tube is not driven at a high frequency. Thus, the luminance of the second fluorescent tube reaches a luminance value the second fluorescent tube should reach originally, so that the second fluorescent tube can be made good use of, and the efficiency can be enhanced.

With such a configuration, color misregistration can be improved efficiently as compared with that in Embodiment 6.

Embodiment 10

Figure 13:
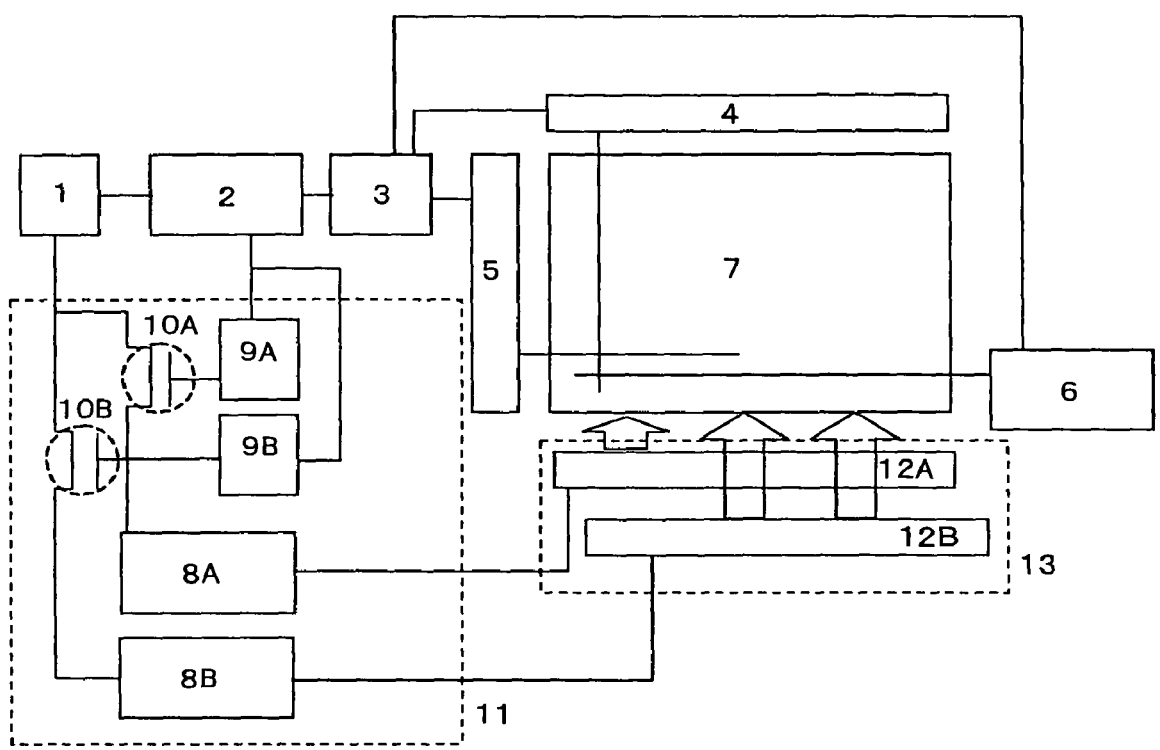
FIG. 13 is a schematic diagram showing a configuration of a liquid crystal display according to Embodiment 10.

The outline of a liquid crystal display according to this embodiment is shown in FIG. 13. The reference numerals 9A and 9B represent blink signal generation circuits; and 10A and 10B, switching devices. parts having the same functions as those in FIG. 5 are referenced correspondingly. This liquid crystal display uses two kinds of light emitting tubes, that is, a first fluorescent tube 12A and a second fluorescent tube 12B. These two kinds of fluorescent tubes are connected to different first and second inverter circuits 8A and 8B respectively, and different blink signal generation circuits 9A and 9B are disposed correspondingly to the inverter circuits respectively.

The first fluorescent tube 12A is applied with a red fluorescent material and a green fluorescent material having slow response speeds and having almost the same response time. On the other hand, the second fluorescent tube 12B is applied with a blue fluorescent material having a fast response speed.

Figure 14:
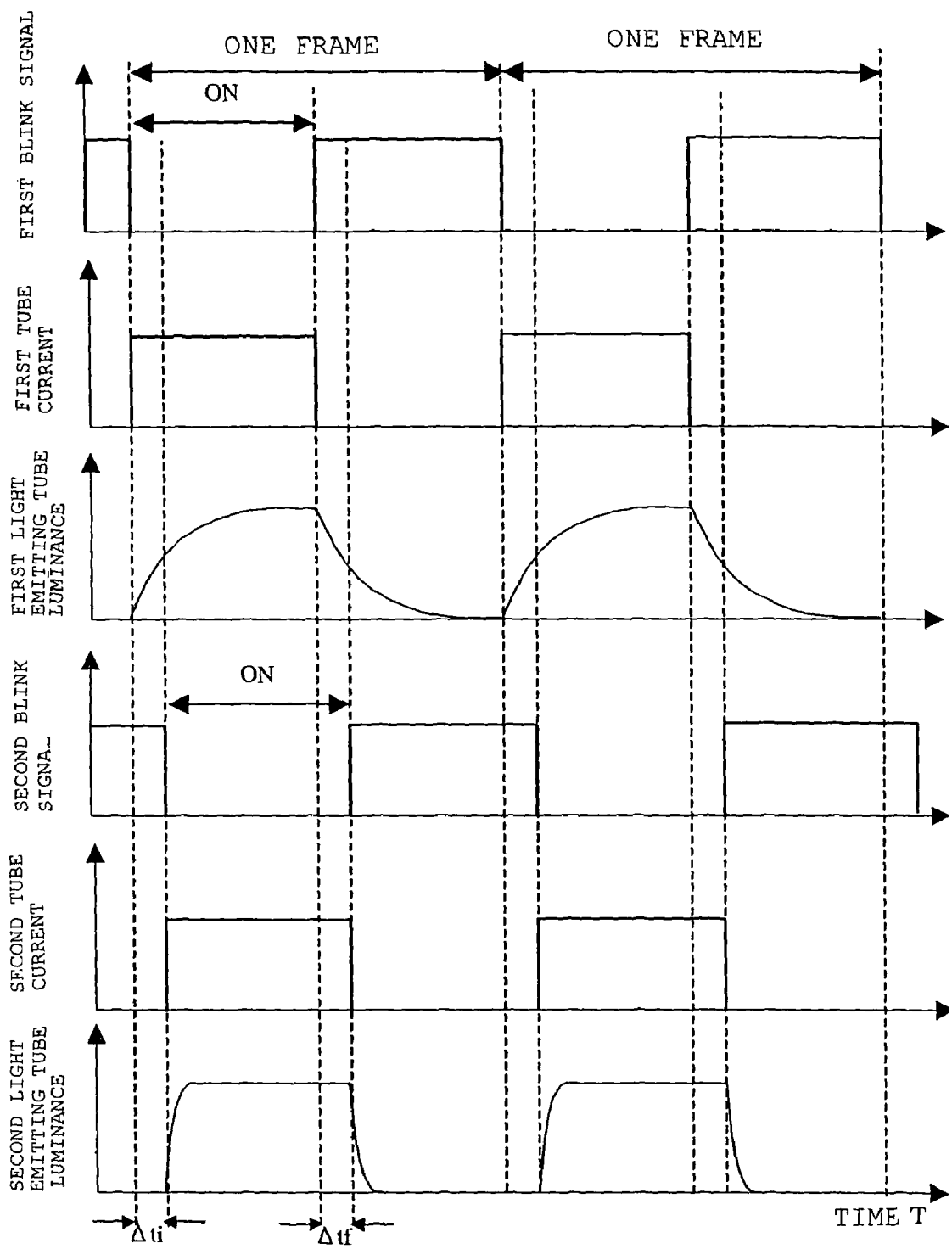
FIG. 14 is a driving waveform chart in Embodiment 10.
Figure 16:
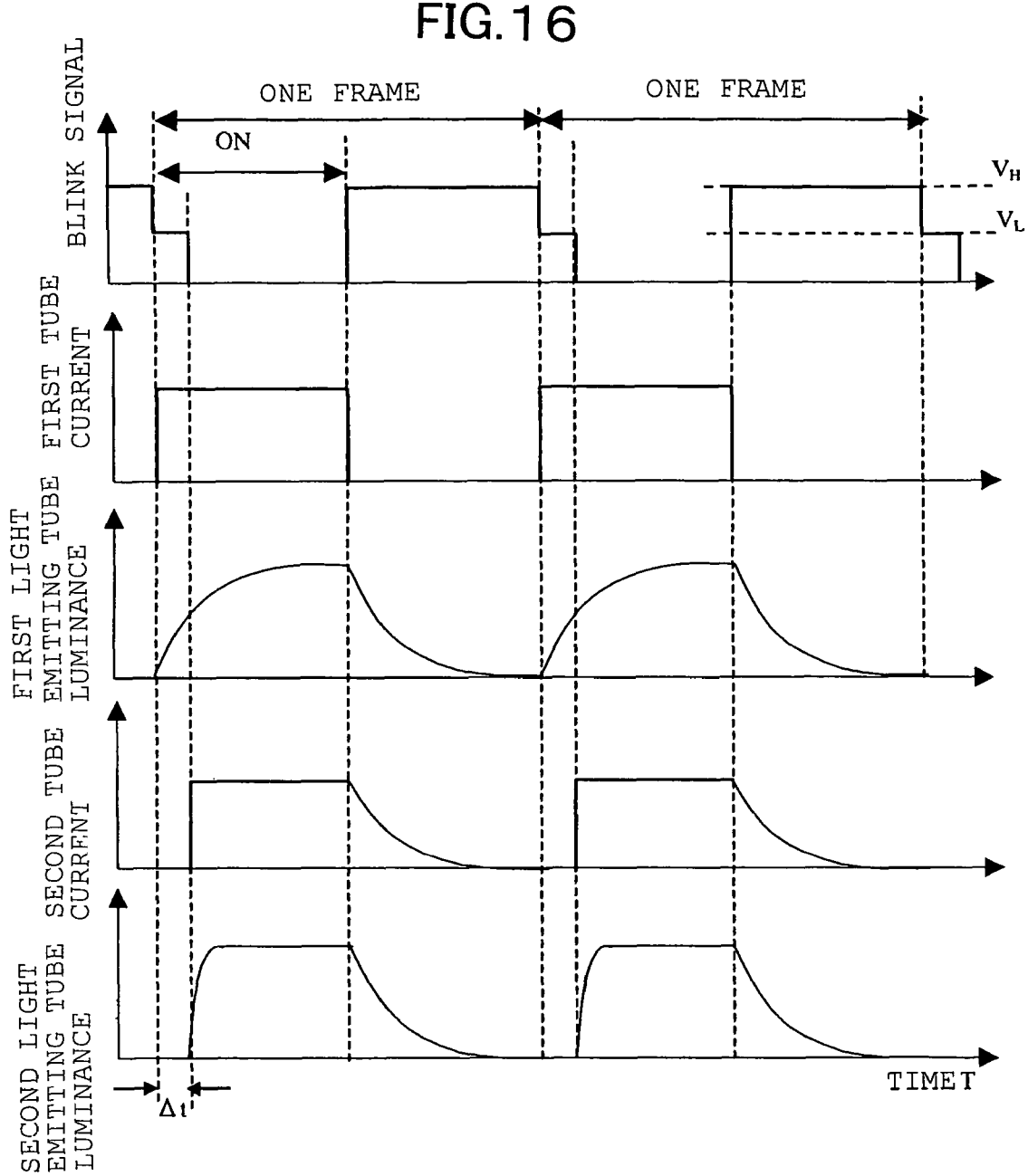
FIG. 16 is a driving waveform chart in Embodiment 11.

FIG. 14 shows the blink signals, the waveforms of currents applied to the cold cathode tubes, the first light emitting tube luminance and the second light emitting tube luminance in this embodiment. A current is applied to the first fluorescent tube 12A having a slow response speed, in sync with a first blink signal. In accordance therewith, the luminance increases gradually. On the other hand, a current is applied to the second fluorescent tube 12B in sync with a second blink signal switched a delay time $\Delta t_i$ behind the first blink signal. Further, in the luminance fall time, the first fluorescent tube 12A having a slow response speed is turned off, and the second fluorescent tube 12B is turned off a delay time $\Delta t_f$ behind the first fluorescent tube 12A. Here, the delay times are set as $\Delta t_i = \Delta t_f = 3$ msec.

In this manner, color misregistration luminance areas can be compensated in the luminance rise time and the luminance fall time as shown in FIGS. 15A and 15B. Thus, color misregistration can be improved on a large scale.

Embodiment 11

In Embodiment 10, the two different blink signal generation circuits 9A and 9B are required to shift the timing of application of a current from the first inverter circuit 8A and the timing of application of a current from the second inverter circuit 8B. However, when the two blink signal generation circuits are provided together, there occurs a problem in cost. Therefore, this embodiment is devised to be able to manage with one blink signal.

A liquid crystal display according to this embodiment uses two kinds of light emitting tubes, that is, a first fluorescent tube 12A and a second fluorescent tube 12B, as shown in FIG. 5. These two kinds of light emitting tubes are connected to different first and second inverter circuits 8A and 8B respectively, and a blink signal generation circuit 9 is disposed in common for the inverter circuits 8A and 8B.

Here, switching devices having different threshold voltages are used as the switching devices put between the inverter circuits 8A and 8B and the blink signal generation circuit 9 respectively as shown in FIG. 13. A switching device having a threshold value between $V_L$ and $V_H$ is used as the first switching device 10A, and a switching device having a threshold value in $V_L$ or lower is used as the second switching device 10B. Thus, at the beginning of one frame, a current is applied only to the first fluorescent tube 12A, and then a current is applied to the second fluorescent tube 12B a delay time $\Delta t$ behind the current to the first fluorescent tube 12A.

On the other hand, in the luminance fall time, it is difficult to shift the timing of current application by only one blink signal. In this embodiment, therefore, the current value of the current applied to the second fluorescent tube 12B is attenuated gradually so that the luminance of the second fluorescent tube 12B is reduced gradually. Thus, the luminance of the second fluorescent tube 12B is made substantially equal to the luminance of the first fluorescent tube 12A. In this manner, the luminance of each light emitting tube makes response as shown in FIG. 15B so that misregistration can be improved in the luminance rise time and the luminance fall time.

Embodiment 12

Figure 17:
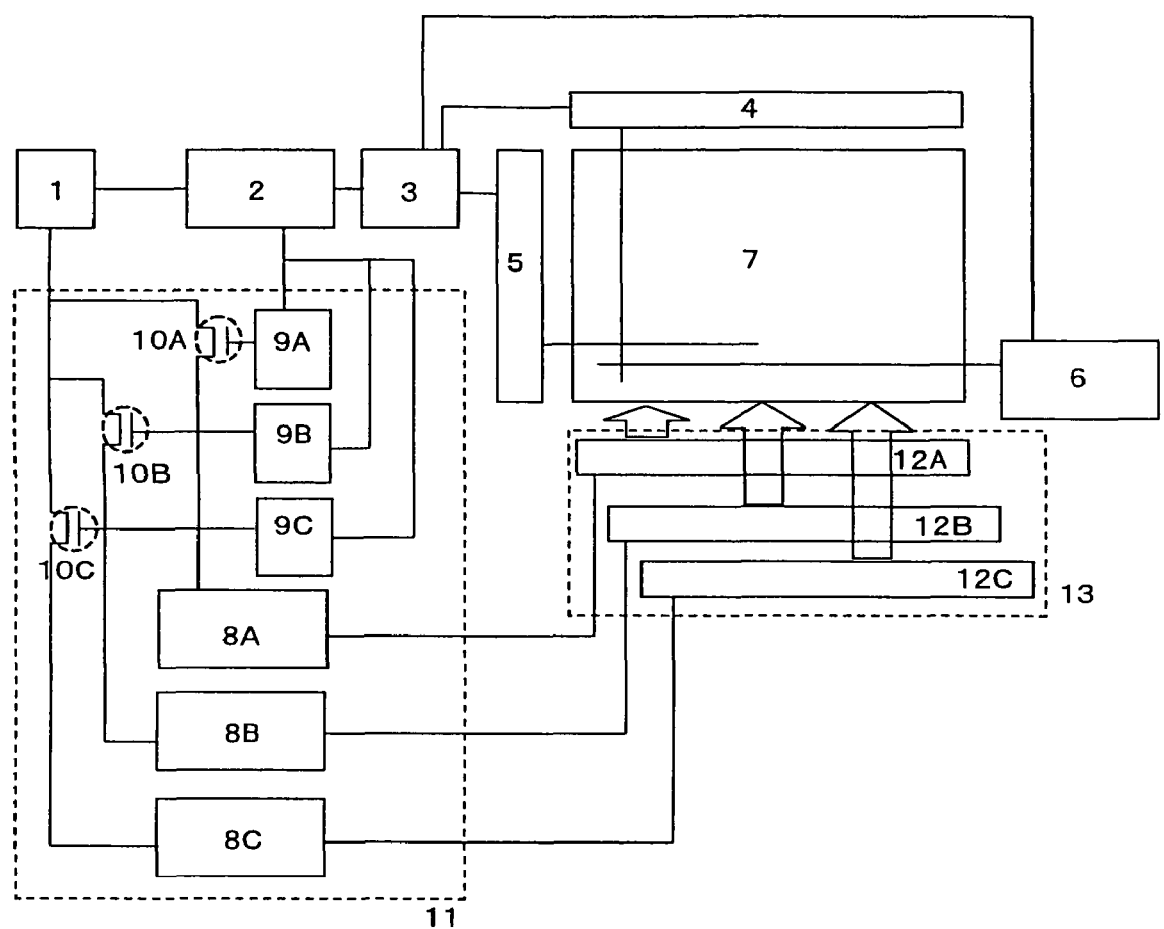
FIG. 17 is a schematic diagram showing a configuration of a liquid crystal display according to Embodiment 12.

FIG. 17 shows the outline of a liquid crystal display according to this embodiment. In this liquid crystal display, three kinds of light emitting tubes, that is, a first fluorescent tube 12A, a second fluorescent tube 12B and a third fluorescent tube 12C are used. These three kinds of fluorescent tubes are applied with fluorescent materials of three different colors (red, blue and green) respectively. Further, the first, second and third fluorescent tubes 12A, 12B and 12C are connected to different first, second and third inverter circuits 8A, 8B and 8C respectively. Different blink signal generation circuits 9A, 9B and 9C are disposed correspondingly to the inverter circuits respectively. Switching devices 10A, 10B and 10C are put between the inverter circuits 8A, 8B and 8C and the blink signal generation circuits 9A, 9B and 9C respectively.

Figure 18:
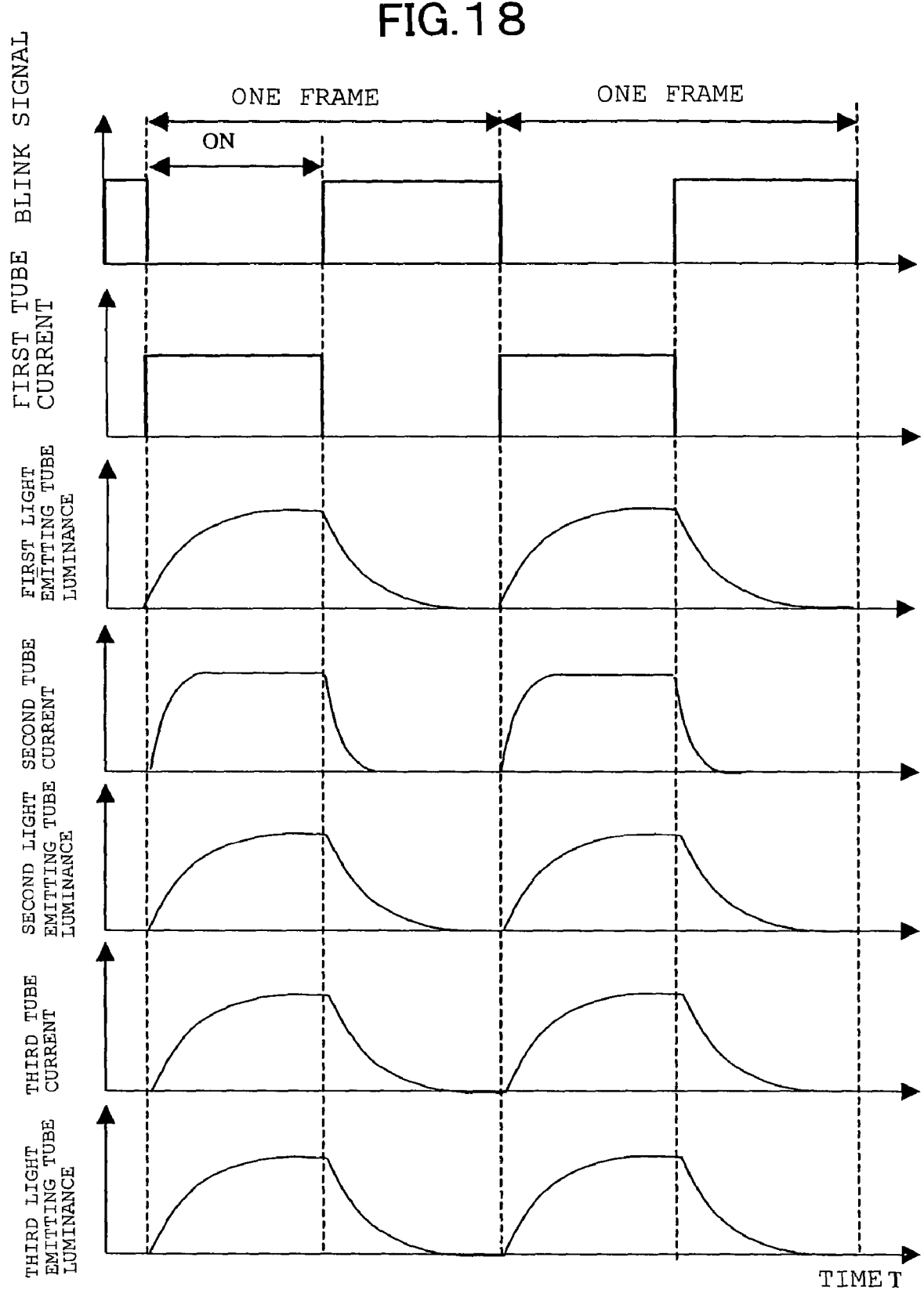
FIG. 18 is a driving waveform chart in Embodiment 12.

Blink signals, currents to the light emitting tubes, and luminance of each light emitting tube in this embodiment are shown in FIG. 18. As shown in FIG. 18, the currents to the three fluorescent tubes 12A, 12B and 12C are controlled independently of one another so that the luminance response rate-of-change curves of the fluorescent materials formed in the fluorescent tubes 12A, 12B and 12C coincide with one another.

Thus, color misregistration can be improved in the luminance rise time and the luminance fall time.

According to the present invention, it is possible to provide a high-quality liquid crystal display in which a blink backlight system light source including a plurality of light emitting tubes each having at least one kind of phosphor, and having a turned-on state and a turned-off state within one frame, is provided, and a luminance factor area from each phosphor is made substantially equal to that from any other phosphor in at least one of a luminance rise time when the light source changes from the turned-off state to the turned-on state and a luminance fall time when the light source changes from the turned-on state to the turned-off state, so that blurring of moving images can be improved when the moving images are displayed.

What is claimed is:

1. A liquid crystal display comprising:
a light source made of a plurality of light emitting tubes, at least one of said plurality of light emitting tubes having plural kinds of phosphors in which each of the plural kinds of phosphors of said at least one of said plurality of light emitting tubes has a different luminance response with respect to a luminance response of another of the plural kinds of phosphors of said at least one of said plurality of light emitting tubes, and said at least one of said light emitting tubes having a turned-on state and a turned-off state within one frame;
a liquid crystal panel for adjusting the amount of light transmitted from said light source; and
a light source drive circuit controlling said light source;
wherein said light source drive circuit controls a luminance factor area of light from one phosphor of said plural kinds of phosphors of said at least one of said plurality of light emitting tubes or a change in luminance factor per time of said light of said one phosphor of said plural kinds of phosphors of said at least one of said plurality of light emitting tubes so as to be substantially equal to that of light from any other phosphor of said plural kinds of phosphors of said at least one of said plurality of light emitting tubes in at least one of a luminance rise time when said light source changes from said turned-off state to said turned-on state and a luminance fall time when said light source changes from said turned-on state to said turned-off state.

2. A liquid crystal display according to claim 1, wherein said light source is made of light emitting tubes of one kind, and each of said light emitting tubes is a multicolor light emitting tube having at least three kinds of color phosphors.

3. A liquid crystal display according to claim 2, wherein a current value of a current applied to each of said light emitting tubes is increased stepwise in said luminance rise time.

4. A liquid crystal display according to claim 3, wherein a step time width $\Delta t_{step}$ of said current whose current value is increased stepwise is set to be shorter than a luminance rise response time of a slow luminance response phosphor of said plural kinds of phosphors and to be longer than a luminance rise response time of a fast luminance response phosphor of said plural kinds of phosphors.

5. A liquid crystal display according to claim 2, wherein a current value of a current applied to each of said light emitting tubes is attenuated stepwise in said luminance fall time.

6. A liquid crystal display according to claim 5, wherein a step time width $\Delta t_{step}$ of said current whose current value is attenuated stepwise is set to be shorter than a luminance fall response time of a slow luminance response phosphor of said plural kinds of phosphors and to be longer than a luminance fall response time of a fast luminance response phosphor of said plural kinds of phosphors.

7. A liquid crystal display according to claim 1, wherein luminance of said plural kinds of phosphors is controlled by a current value of a current applied by said light source drive circuit to said at least one of said plurality of light emitting tubes.

8. A liquid crystal display according to claim 7, wherein at the beginning of said luminance rise time, said current value of said current applied to said light emitting tube is a current value $I_2$ not smaller than a current value $I_1$ necessary for said plural kinds of phosphors to emit light with predetermined luminance in one frame.

9. A liquid crystal display according to claim 8, wherein a time $\Delta t_{OD}$ when said current value $I_2$ not smaller than said current value $I_1$ necessary for said plural kinds of phosphors to emit light with said predetermined luminance is applied to said light emitting tube, a ratio N of said current value $I_2$ to said current value $I_1$, and a rise response time $\tau_{on}$ of a fastest luminance response phosphor of said plural kinds of phosphors belonging to said light emitting tube, satisfy a relationship of Expression 1:

$$\Delta t_{OD} \leq \{-\tau_{on}/\ln 10\} \times \ln(1-1/N) \qquad \text{(Expression 1)}$$

where $N=I_2/I_1$.

10. A liquid crystal display according to claim 9, wherein said ratio N of said current value $I_2$ to said current value $I_1$ is larger than 1 and smaller than 6.5.

11. A liquid crystal display according to claim 1, wherein said light source is made of light emitting tubes of at least two kinds, and each of said light emitting tubes is a multicolor light emitting tube having at least two kinds of color phosphors.

12. A liquid crystal display according to claim 11, wherein at least two kinds of color phosphors belonging to one and the same tube of said multicolor light emitting tubes have a substantially equal luminance rise response time and a substantially equal luminance fall response time.

13. A liquid crystal display according to claim 1, wherein said light source is made of light emitting tubes of at least two kinds including at least one multicolor light emitting tube, and at least another of said light emitting tubes is a unicolor light emitting tube having only one kind of phosphor.

14. A liquid crystal display according to claim 13, wherein at least two kinds of color phosphors belonging to one and the same tube of said at least one multicolor light emitting tube have a substantially equal luminance rise response time and a substantially equal luminance fall response time.

15. A liquid crystal display according to claim 1, wherein said light source is made of light emitting tubes of at least three kinds including at least one multicolor light emitting tube, and another of said light emitting tubes is a unicolor light emitting tube having only one kind of phosphor.

16. A liquid crystal display according to claim 1, wherein luminance of said plural kinds of phosphors is controlled by a current value of a current applied to each of said light emitting tubes.

17. A liquid crystal display according to claim 16, wherein a current value of a current applied to each light emitting tube having a fast luminance response phosphor is increased gradually in said luminance rise time.

18. A liquid crystal display according to claim 16, wherein at the beginning of said luminance rise time, said current value of said current applied to each light emitting tube having a fast luminance response phosphor is a current value $I_2$ not smaller than a current value $I_1$ necessary for said plural kinds of phosphors to emit light with predetermined luminance in one frame.

19. A liquid crystal display according to claim 16, wherein said current value of said current applied to each light emitting tube having a fast luminance response phosphor is attenuated gradually in said luminance fall time.

20. A liquid crystal display according to claim 16, wherein in said luminance rise time and a lighting period, a current value of a current applied to each light emitting tube is changed like a rectangular shape so as to drive said light emitting tube.

21. A liquid crystal display according to claim 20, wherein in said current having a current value changed like a rectangular shape, a time width of said rectangular current value immediately after start of application of said current is longer than a time width of said rectangular current value immediately before termination of application of said current.

22. A liquid crystal display according to claim 20, wherein a time width of said rectangular current value is not longer than 3.3 msec.

23. A liquid crystal display according to claim 16, wherein in said luminance rise time, time of start of application of a current to each light emitting tube having a fast luminance response phosphor is controlled to be delayed by a predetermined time $\Delta t_i$ with respect to time of start of application of a current to each light emitting tube having a slow luminance response phosphor, so that a luminance factor area of said fast luminance response phosphor is substantially equal to a luminance factor area of said slow luminance response phosphor.

24. A liquid crystal display according to claim 16, wherein in said luminance fall time, time of termination of application of a current to each light emitting tube having a slow luminance response phosphor is controlled to be delayed by a predetermined time $\Delta t_f$ with respect to time of termination of application of a current to each light emitting tube having a fast luminance response phosphor, so that a luminance factor area of said fast luminance response phosphor is substantially equal to a luminance factor area of said slow luminance response phosphor.

25. A liquid crystal display according to claim 24, wherein said luminance rise time and said luminance fall time are not longer than 3.3 msec.

26. A liquid crystal display according to any one of claims 22 through 25, wherein said delay times $\Delta t_i$ and $\Delta t_f$ are almost half as long as a luminance rise response time and a luminance fall response time of a slow response phosphor of said plural kinds of phosphors respectively.

27. A liquid crystal display according to claim 16, wherein a luminance rise response time and a luminance fall response time of a slow luminance response phosphor of said plural kinds of phosphors are not longer than 3.3 msec.

28. A liquid crystal display according to any one of claims 22 through 27, wherein said delay times $\Delta t_i$ and $\Delta t_f$ are not longer than 1.7 msec.

29. A liquid crystal display according to claim 1, wherein said phosphors are fluorescent materials to be excited by ultraviolet rays to thereby emit visible light.

30. A liquid crystal display according to claim 1, wherein said light emitting tubes are cold cathode tubes.

31. A liquid crystal display according to claim 1, wherein at the turned-on state, a current applied by said light source drive circuit to said at least one of said plurality of light emitting tubes has at least two values.

32. A liquid crystal display according to claim 31, wherein the current applied by said light source drive circuit to said at least one of the plurality of light emitting tubes has a stepped-shape.

33. A liquid crystal display according to claim 31, wherein the current applied by said light source drive circuit to said at least one of the plurality of light emitting tubes has a pulse shape.

* * * * *